United States Patent
Armstrong et al.

(10) Patent No.: US 12,543,648 B2
(45) Date of Patent: Feb. 10, 2026

(54) CRYOGENIC SEPARATION SYSTEMS AND METHODS

(71) Applicant: Cryomass LLC, Englewood, CO (US)

(72) Inventors: Matthew John Armstrong, Anchorage, AK (US); Priyesh Sharma, Irvine, CA (US); Aaron Michael Godin, Kelowna (CA)

(73) Assignee: Cryomass LLC, Englewood, CO (US)

( * ) Notice: Subject to any disclaimer, the term of this patent is extended or adjusted under 35 U.S.C. 154(b) by 0 days.

(21) Appl. No.: 18/975,872

(22) Filed: Dec. 10, 2024

(65) Prior Publication Data

US 2025/0176467 A1 Jun. 5, 2025

Related U.S. Application Data

(63) Continuation of application No. 18/382,308, filed on Oct. 20, 2023, now Pat. No. 12,193,364.

(60) Provisional application No. 63/458,971, filed on Apr. 13, 2023, provisional application No. 63/431,875, filed on Dec. 12, 2022, provisional application No. 63/418,012, filed on Oct. 20, 2022.

(51) Int. Cl.
  *A01D 61/00* (2006.01)
  *A01D 82/00* (2006.01)
  *B07B 1/28* (2006.01)

(52) U.S. Cl.
  CPC ............. *A01D 61/00* (2013.01); *A01D 82/00* (2013.01); *B07B 1/28* (2013.01); *B07B 2201/04* (2013.01)

(58) Field of Classification Search
  CPC .......... A01D 61/00; A01D 82/00; B07B 1/28; B07B 2201/04; B07B 13/16
  USPC .......................................................... 209/11
  See application file for complete search history.

(56) References Cited

U.S. PATENT DOCUMENTS

| | | | |
|---|---|---|---|
| 3,771,729 A | 11/1973 | Frable | |
| 4,428,535 A | 1/1984 | Venetucci | |
| 4,483,488 A | 11/1984 | Luff et al. | |
| 6,170,667 B1 * | 1/2001 | Bilak | E21B 21/066 209/315 |
| 6,422,937 B1 * | 7/2002 | McLeod | B08B 3/06 460/12 |
| 8,349,193 B2 * | 1/2013 | Fout | B01D 29/68 210/523 |
| 2002/0129616 A1 * | 9/2002 | Jones | A23G 9/225 62/381 |

(Continued)

FOREIGN PATENT DOCUMENTS

| | | | | |
|---|---|---|---|---|
| DE | 10053013 A1 * | 4/2002 | ......... | B29B 17/0408 |
| DE | 69818385 T2 * | 6/2004 | ........... | A23B 2/8033 |
| JP | 2019528679 A * | 10/2019 | ............... | A23G 9/06 |

OTHER PUBLICATIONS

International Preliminary Report on Patentability & Written Opinion for International Application No. PCT/US2023/035604 dated May 1, 2025.

*Primary Examiner* — Terrell H Matthews
(74) *Attorney, Agent, or Firm* — Carlson, Gaskey & Olds, P.C.

(57) ABSTRACT

A cryogenic processing system includes a cryogenic fluid source, and an auger, which includes an auger vessel containing at least one screw assembly. The screw assembly includes a flighting and a hollow shaft radially inward of the flighting. The shaft is in fluid communication with the cryogenic fluid source and includes one or more nozzles for dispensing cryogenic fluid within the auger vessel.

20 Claims, 20 Drawing Sheets

(56) References Cited

U.S. PATENT DOCUMENTS

| | | | |
|---|---|---|---|
| 2009/0100846 A1* | 4/2009 | Waznys | F25D 3/11 |
| | | | 62/381 |
| 2010/0018909 A1* | 1/2010 | Smith | B01D 33/0376 |
| | | | 209/269 |
| 2010/0089651 A1* | 4/2010 | Brunett | B01D 33/37 |
| | | | 175/66 |
| 2019/0194585 A1* | 6/2019 | Vanevenhoven | A23B 2/88 |

* cited by examiner

CRYOGENIC SEPARATION SYSTEMS AND METHODS

CROSS-REFERENCED TO RELATED APPLICATION

This application is a continuation of U.S. application Ser. No. 18/382,308, filed Oct. 20, 2023, which claims priority to U.S. Provisional Application No. 63/418,012, filed Oct. 20, 2022, U.S. Provisional Application No. 63/431,875, filed Dec. 12, 2022, and U.S. Provisional Application No. 63/458,971, filed Apr. 13, 2023.

BACKGROUND

Plant components are widely popular across different industries for use in cosmetics, perfumes, drug compositions, food, crafts, and fabrics. To obtain the desired components, plant material may be processed to separate those components of the plant from other parts not needed.

For example, resin-containing indumentums of a plant can include the highest concentration of certain plant compounds, which may be used in applications such as in drug manufacture. These resin-containing indumentums are extremely fragile and can rupture during mechanical separation. Further, the resins often contain delicate compounds that are sensitive to heat, light, and oxygen. Thus, much of the compounds can be lost during conventional methods of processing, such as solvent extraction, where heat and/or oxygen are often required. Although plant components are described in this section, other feedstock may benefit from this disclosure.

SUMMARY

A cryogenic processing system according to an example of this disclosure includes a cryogenic fluid source, and an auger, which includes an auger vessel containing at least one screw assembly. The screw assembly includes a flighting and a hollow shaft radially inward of the flighting. The shaft is in fluid communication with the cryogenic fluid source and includes one or more nozzles for dispensing cryogenic fluid within the auger vessel.

In a further example of the foregoing, the auger vessel includes an inlet and an outlet, and the system includes a hopper positioned to guide feedstock into the inlet.

In a further example of any of the foregoing, the auger vessel includes an inlet and an outlet, and the system includes a separation system downstream of the outlet. The separation system includes a first screen deck, a second screen deck below the first screen deck, at least one agitator for introducing agitation to the first screen deck, and at least one cryogenic spray manifold positioned to spray cryogenic fluid onto feedstock flowing through the separation system.

In a further example of any of the foregoing, the system includes a first sub-frame assembly, which includes the first screen deck. A first catch tray is located below the first screen deck. One or more vertical walls are disposed at the perimeter of the sub-frame assembly. The first sub-frame assembly is mounted to the primary frame.

In a further example of any of the foregoing, the catch tray includes one or more openings near a second lateral side of the sub-frame assembly, and the sub-frame assembly includes one or more inlet openings near a first lateral side of the sub-frame assembly opposite the second lateral side.

In a further example of any of the foregoing, the sub-frame assembly includes a discharge port at the second lateral side.

In a further example of any of the foregoing, the first screen deck and first catch tray slope downward as they extend from the first lateral side to the second lateral side.

In a further example of any of the foregoing, the auger vessel is cylindrical and includes a central axis. The shaft has a shaft central axis aligned with the auger vessel central axis.

In a further example of any of the foregoing, the auger vessel includes a first vessel and a second vessel fluidly adjoined to the first vessel.

In a further example of any of the foregoing, the screw assembly includes a first shaft within the first vessel and a second shaft within the second vessel coupled to the first shaft.

A method of processing feedstock according to an example of this disclosure includes moving the feedstock through an auger and spraying the feedstock within the auger with cryogenic fluid through one or more nozzles disposed on a shaft of a screw assembly of the auger.

In a further example of the foregoing, the method includes moving the feedstock from the auger to a separation system. The separation system includes a first screen deck. The method includes agitating the first screen deck and spraying the feedstock within the separation system with cryogenic fluid.

In a further example of any of the foregoing, the method includes collecting feedstock from a discharge port in the separation system.

In a further example of any of the foregoing, the method includes removing cryogenic fluid from the separation system.

In a further example of any of the foregoing, the feedstock is trichome bearing plant material.

A cryogenic processing system according to an example of this disclosure includes a cryogenic fluid source and a separation system. The separation system includes a first screen deck, a second screen deck below the first screen deck, at least one agitator for introducing agitation to the first screen deck, and at least one cryogenic spray manifold positioned to spray cryogenic fluid from the cryogenic fluid source onto feedstock flowing through the separation system.

In a further example of the foregoing, a first sub-frame assembly includes the first screen deck, a first catch tray below the first screen deck, and one or more vertical walls disposed at the perimeter of the sub-frame assembly. The first sub-frame assembly is mounted to a primary frame.

In a further example of any of the foregoing, the catch tray includes one or more openings near a second lateral side of the sub-frame assembly, and the sub-frame assembly includes one or more inlet openings near a first lateral side of the sub-frame assembly opposite the second lateral side.

In a further example of any of the foregoing, the sub-frame assembly includes a discharge port at the second lateral side.

In a further example of any of the foregoing, the first screen deck and first catch tray slope downward as they extend from the first lateral side to the second lateral side.

These and other features may be best understood from the following specification and drawings, the following of which is a brief description.

DETAILED DESCRIPTION

This application relates to systems and methods for processing feedstock, such as cooling or embrittling the feedstock, in cryogenic liquid or gas. This application further relates in general to separating feedstock and, in particular, to systems and methods for cryogenic mechanical separation of feedstock.

In some examples, the feedstock may be trichome bearing plant material such as lavender, hops, cannabis, or any other trichome bearing plant. In other examples, it may be other plant parts such as seeds, bulbs, roots, shoots, leaves, flowers, fruits, and other plant-based material. In other examples still, the feedstock may be non-plant-based material such rubber, plastics, or mineral bearing aggregates.

The cryogenic fluid, which may include liquid or gas, described herein can include helium, hydrogen, nitrogen, neon, air, oxygen, fluorine, argon, methane, carbon dioxide, or a combination of such fluids. Additionally, other types of cryogenic fluids are possible. In some examples, a cryogenic fluid may be at or below −150 degrees Celsius. In some examples, liquid nitrogen or liquid argon are utilized as the cryogenic fluid.

In some examples, systems and methods are disclosed to efficiently and effectively flash freeze and embrittle, comminute, and classify feedstock. The system can be used to separate desirable plant components, such as resin-containing indumentums, from the rest of the plant material with high efficiency and minimal chemical degradation in some examples. Of course, other applications are contemplated.

Figure 1:
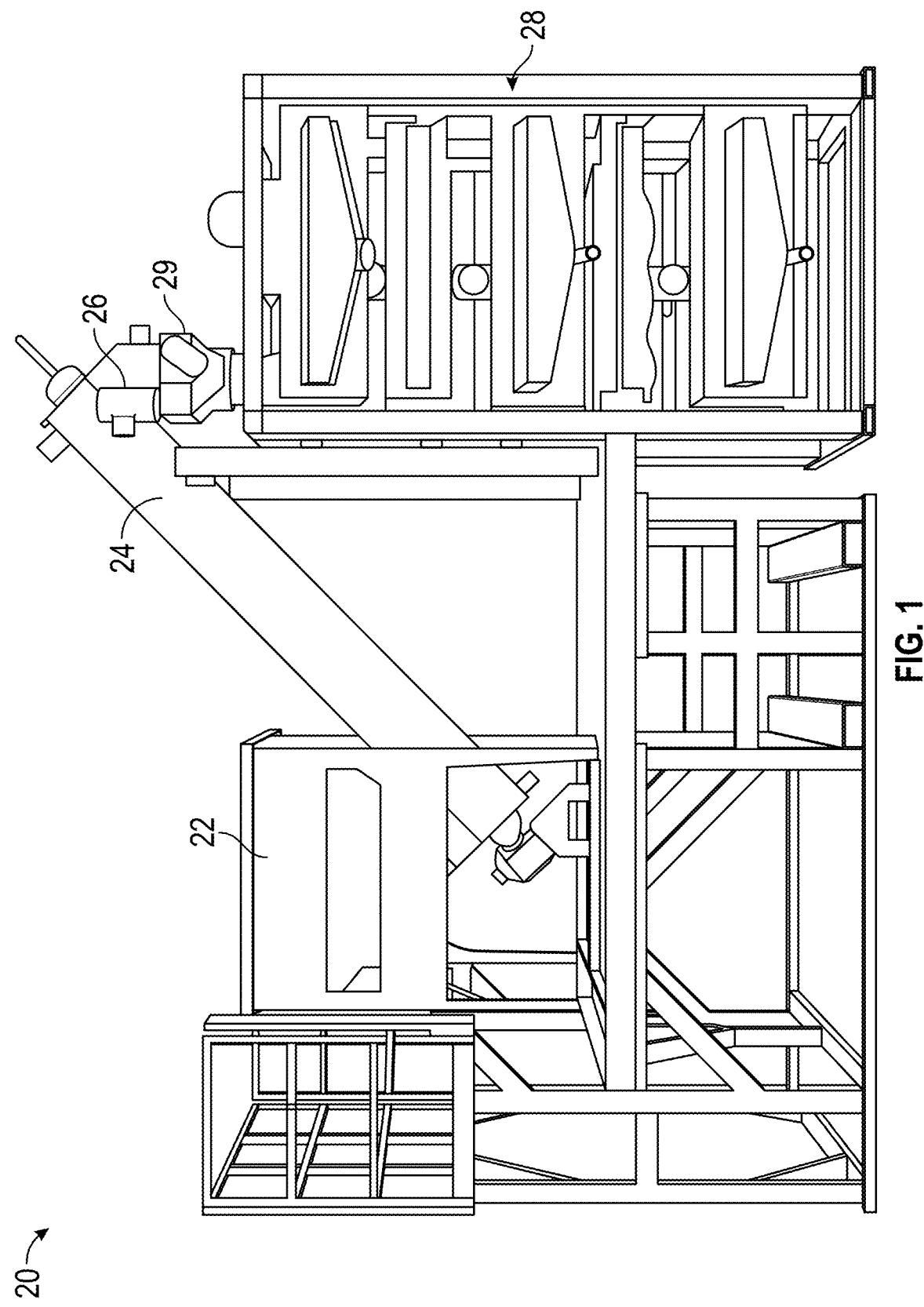
FIG. 1 illustrates an example cryogenic processing system.

FIG. 1 illustrates an example cryogenic processing system 20. In the example, input feedstock is loaded into in a hopper 22, which may be tapered as shown, and which discharges the feedstock into an auger 24. In some examples, the hopper 22 may be vibrated, such as with a vibratory motor (not shown), to encourage the feedstock to deposit into an outlet at the bottom of the hopper 22. The hopper 22 guides the feedstock into the auger 24. The feedstock travels through the auger 24 before exiting through a discharge port 26 at an opposite end of the auger 24 from the hopper 22. In some examples, the feedstock may be cooled with cryogenic fluid as it travels through the auger 24.

The feedstock then enters a cryogenic separation system 28. In some examples, as explained below, the cryogenic separation system 28 utilizes cryogenic fluid and mechanical separation to classify the inputted material. A mill 29, such as a roller mill in some examples, may be provided between the auger 24 and the cryogenic separation system 28, to reduce feedstock particle size. In some examples, the feedstock may be cooled with cryogenic fluid as it travels through the mill 29.

Figure 2:
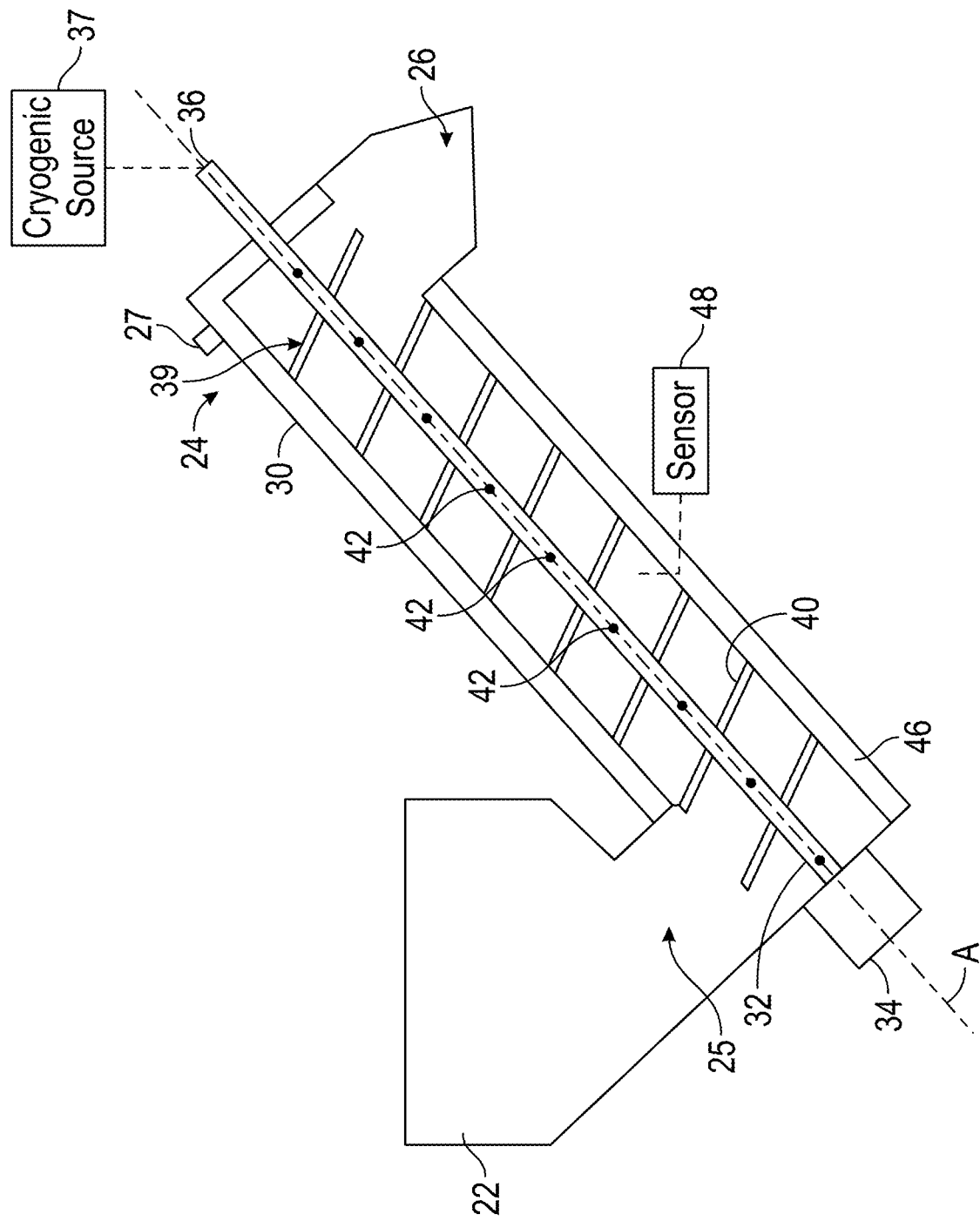
FIG. 2 illustrates a portion of the example system of claim 1.

FIG. 2 schematically illustrates a portion of the example cryogenic processing system 20. However, the components shown in FIG. 2, including the example auger 24, may be utilized in other systems. The example auger 24 includes a hollow trough or auger vessel 30, which may be cylindrical or "U" shaped in some examples. Other shapes are contemplated. In some examples, the auger vessel 30 may include access ports (see FIG. 18) for sampling or other purposes.

Within the example auger vessel 30 is a screw assembly 39 for conveying feedstock through the auger vessel 30. In some examples, the screw assembly 39 may include multiple screws in different arrangements. The example screw assembly 39 includes a helical flighting 40 that wraps around a hollow radially central shaft 32, such that the shaft is radially inward of the flighting. In some examples, the flighting 40 is coupled to the shaft 32. The shaft 32 may be rotationally driven about an axis A by a drive unit 34 and may include a cryogenic inlet 36 for receiving cryogenic fluid within the shaft from a cryogenic fluid source 37, as is shown schematically. In some examples, when the auger vessel 30 is cylindrical, the cylindrical axis is also the axis A as shown.

The auger flighting 40, connected to the drive unit 34 or the central shaft 32, rotates within the auger vessel 30 for conveying the feedstock through the auger vessel 30 from the inlet 25 toward the discharge port 26. In some examples, the shaft 32 may be fixed, and the flighting 40 may rotate relative to the shaft 32. In some examples in which the hollow central shaft 32 rotates, a cryogenic fluid rotation joint, rotary union, or similar device may connect in-line with the cryogenic inlet 36 such that a stationary cryogenic supply can provide cryogenic fluid into the rotating shaft 32.

The example shaft 32 includes one or more nozzles 42 providing outlets for the fluid, such as cryogenic fluid, input into the shaft 32. The example nozzles 42 are positioned to spray cryogenic fluid on the feedstock moving through the auger 24. In some examples, nozzles 42 are axially spaced from one another along the length of the shaft 32 relative to the axis A, such as between consecutive flighting blades, and, in some examples, pairs of axially aligned nozzles 42 are circumferentially spaced from one another 180° about the shaft 32. Other nozzle 42 configurations are contemplated. The example auger 24 may include an insulated jacket 46 to reduce heat transfer between the auger vessel 30 and the environment external to the auger 24. In some examples, the jacket 46 is a vacuum insulated jacket. In some examples, the jacket 46 circulates heat transfer media.

In some examples, the outer edge of the flighting 40 may be lined with a cryogenic-tolerant polymer, such as UHMW-PE (ultra-high molecular weight polyethylene), that can expand or contract with the temperature change inside the auger vessel 30. In some examples, the distance between the outer edge of the flighting 40 and the interior wall of the auger vessel 30 is sufficiently small to prevent feedstock from passing, but large enough to allow for expansion and contraction of the flight edge. In some examples, the shaft 32 and/or flighting 40 may be made of steel, steel alloy, a polymer, or some combination thereof.

One or more temperature sensors 48 (shown schematically) may be placed throughout the auger 24 to monitor process temperatures. In some examples, a vacuum port 27 (shown schematically) may be provided on the auger 24 to remove excess cryogenic gas from the system, which may be reintroduced in some examples to supplement cooling.

As shown in FIGS. 1 and 2, the auger 24 is oriented such that feedstock is conveyed upward through the auger vessel 30 before reaching the discharge port 26. Other orientations are contemplated in other examples.

Figure 3:
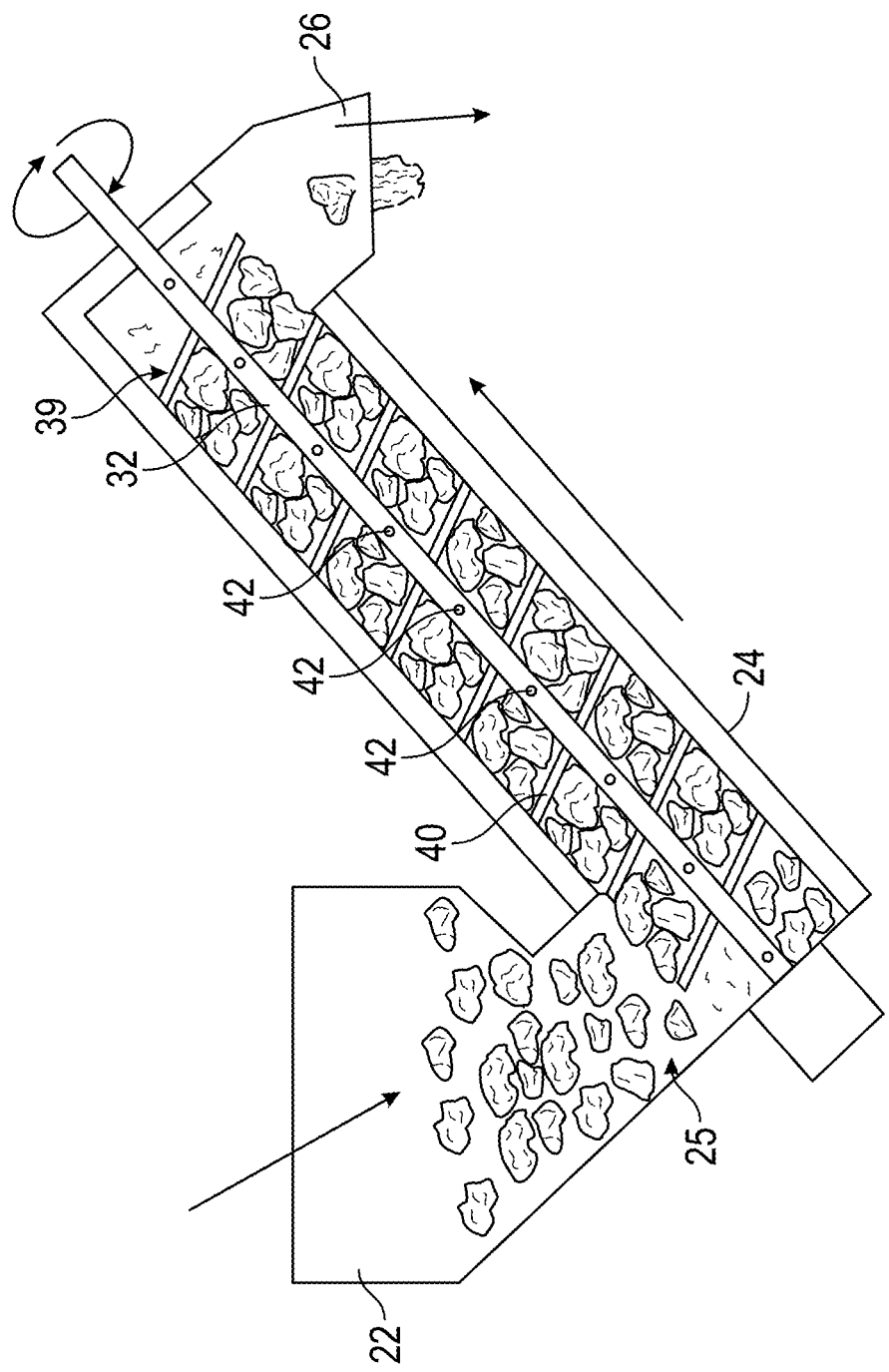
FIG. 3 illustrates an example flow of feedstock through the portion of the system of claim 2.

FIG. 3 schematically illustrates an example flow of feedstock through the portion of the example cryogenic processing system 20 shown in FIG. 2. Feedstock is input into the hopper 22, ultimately settling at the bottom where an outlet of the hopper 22 meets the inlet 25 of the auger 24. When the feedstock is inside the auger vessel 30, it is exposed to cryogenic fluid discharged through the spray nozzles 42. As the flighting 40 rotates, the feedstock is conveyed towards the auger discharge port 26 while continuously being exposed to the cryogenic fluid. During this time, the feedstock may be tumbling between the auger flighting 40, being penetrated evenly with the cryogenic fluid as it moves up the auger 24. Once the feedstock reaches the end of the auger 24, it exits through the discharge port 26. The example auger 24 therefore provides a continuous cryogenic conveyor for efficiently embrittling or flash freezing feedstock in cryogenic fluid. The example auger 24 may provide rapid cooling and a uniform cryogenic temperature through the cooling auger vessel 30 in some examples.

Figure 4:
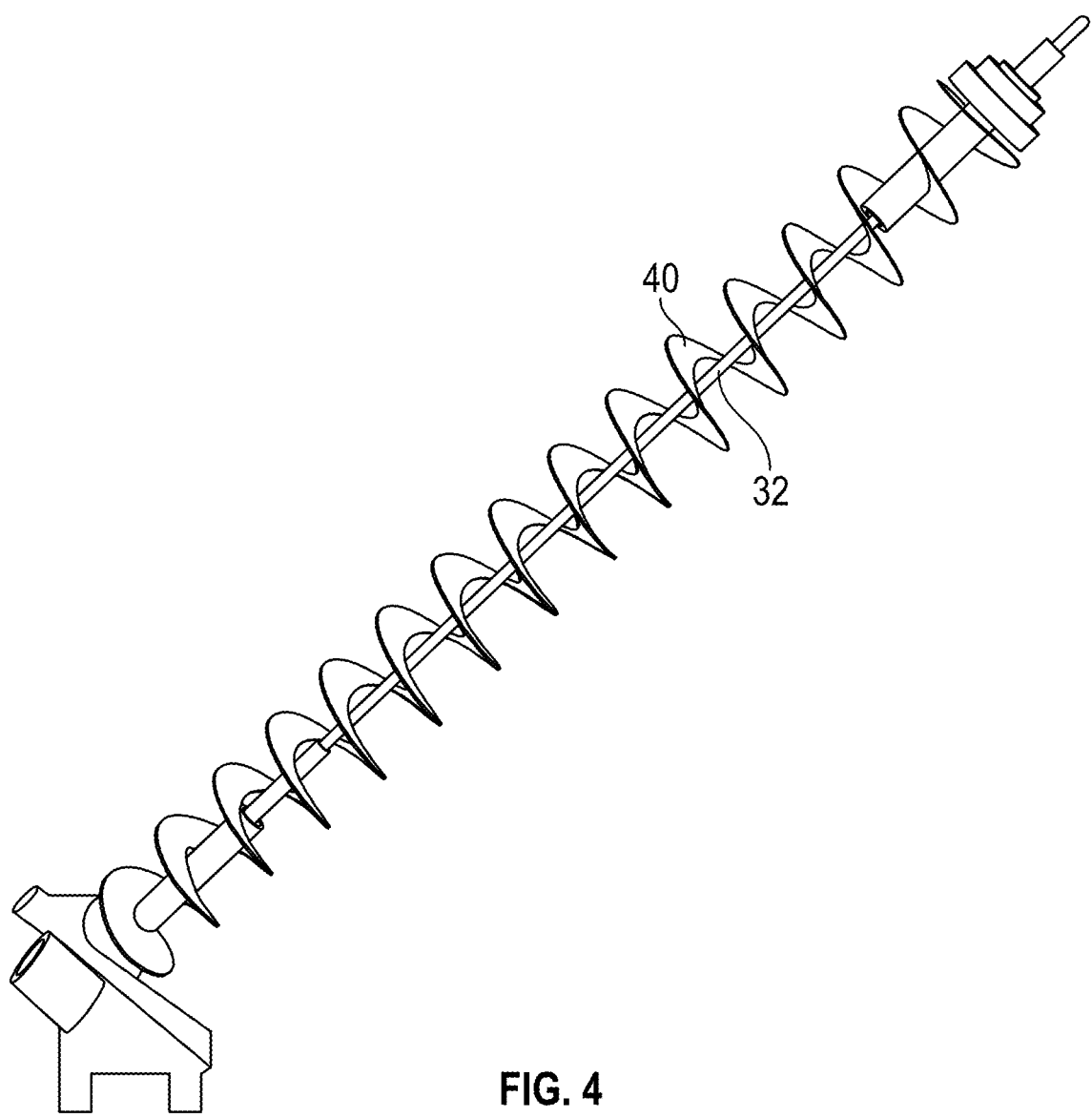
FIG. 4 illustrates a portion of an example auger.

FIG. 4 illustrates a portion of an example auger 24 including the shaft 32 and the helical flighting 40.

Figure 5:
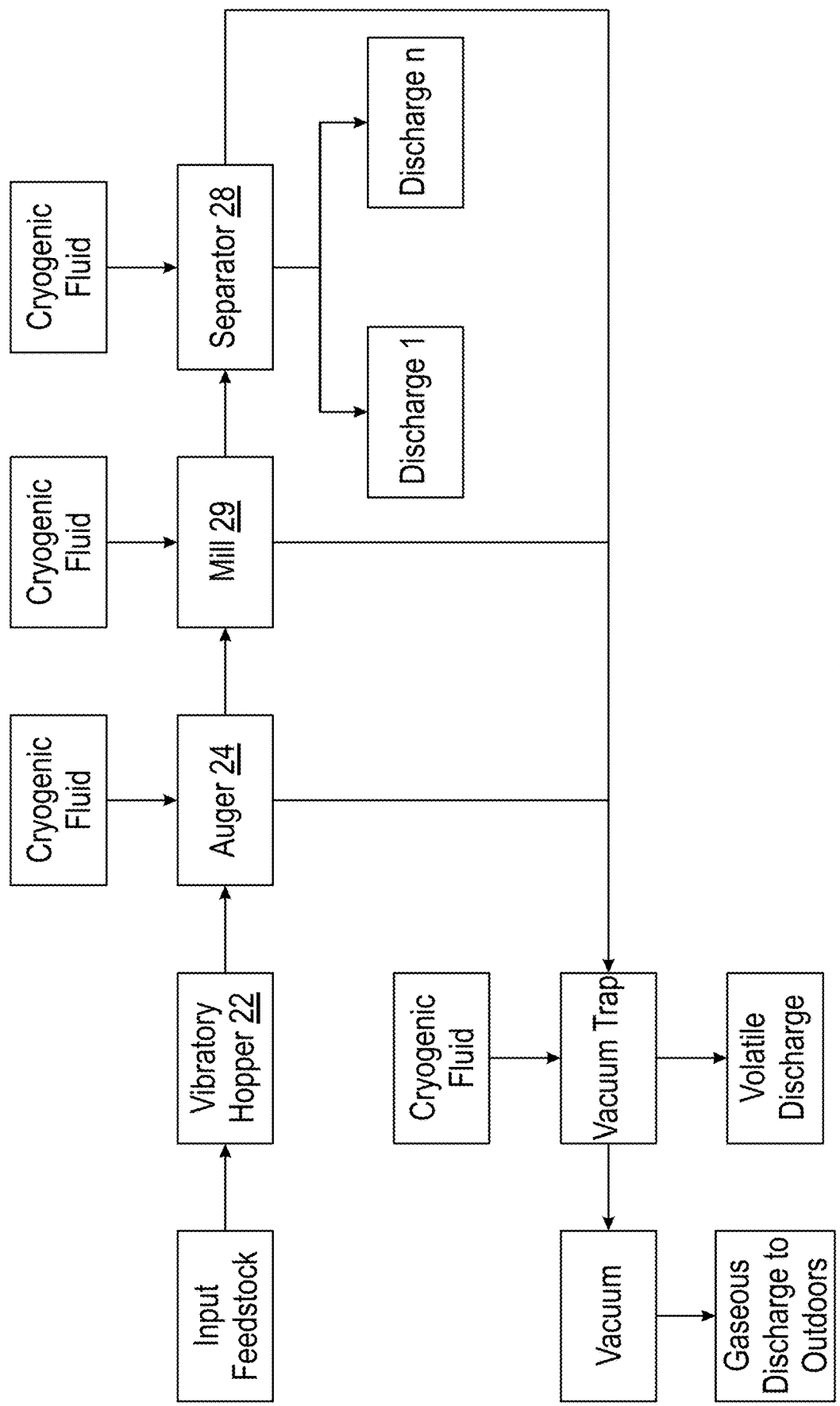
FIG. 5 illustrates an example process flow diagram.

FIG. 5 illustrates an example process flow diagram, including feedstock inputs and outputs and cryogenic fluid inputs and outputs, that may be utilized with the examples disclosed herein. In the example, feedstock is input into the hopper 22, flows through the auger 24 to the mill 29 and separation system 28. Cryogenic fluid may be added to the feedstock while in one or more of the auger 24, mill 29, and separator 28. The separation system 28 may have one or more discharge ports for discharging the processed feedstock. A vacuum system may be connected to one or more of the auger 24, mill 29, and separation system 28 for removal of cryogenic fluid.

Figure 6:
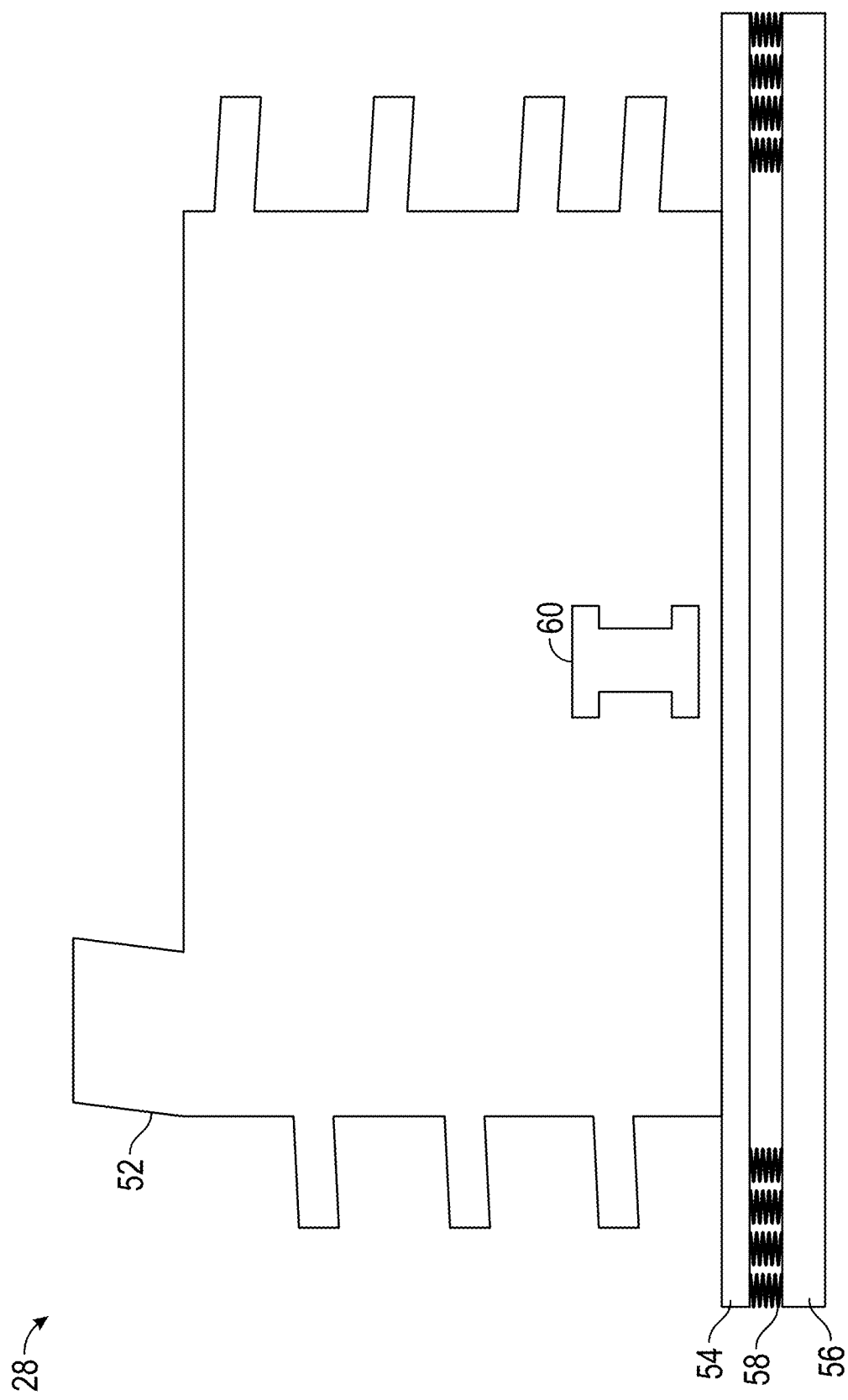
FIG. 6 schematically illustrates an example cryogenic separation system.

FIG. 6 schematically illustrates an example cryogenic separation system 28 for separation and classification of input feedstock. While the example separation system 28 may be used with the example cryogenic processing system 20 of FIG. 1, a skilled person having the benefit of this disclosure would recognize that the example cryogenic separation system 28 may be used in other systems as well.

Figure 7:
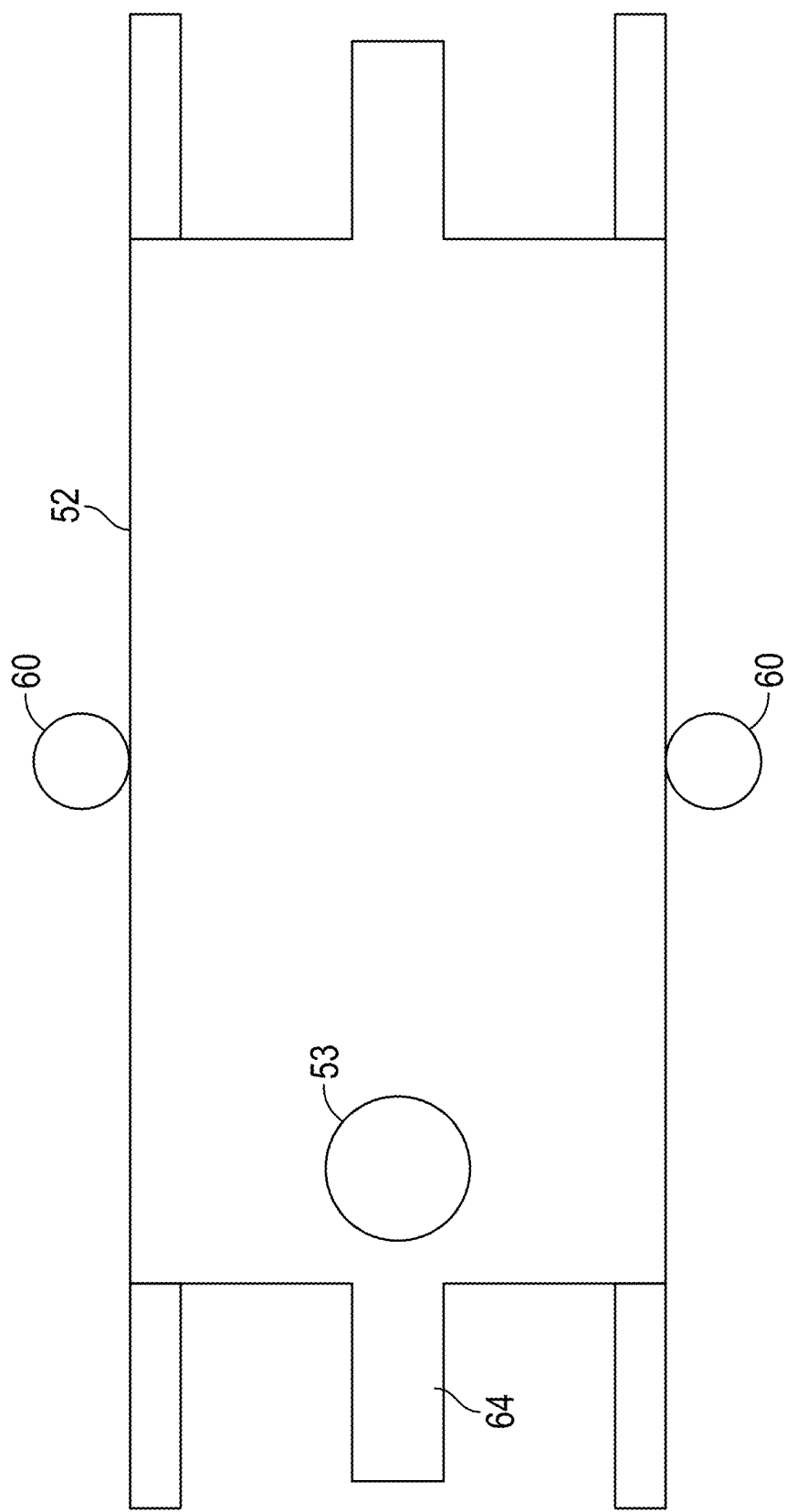
FIG. 7 schematically illustrates a top view of the example cryogenic separation system of FIG. 6.

The example cryogenic separation system 28 uses cryogenic fluid and mechanical separation to classify the inputted feedstock. The example system 28 includes a box or separation vessel 52 mounted to a frame 54 coupled to a fixed sub-frame 56 via one or more vibratory springs 58. In some examples, the vessel 52 may include one or more vertical walls for containment of the feedstock and cryogenic fluid and may be made of a steel alloy, a polymer, or some combination thereof. One or more agitators 60, which may be vibratory motors in some examples, may be coupled to the separation vessel 52. In some examples, the agitator 60 is a rotary electric vibrator. In some examples, the agitator 60 may be a Murakami Seiki KEE 3-4 motor or similar motor. In some examples, as shown in the overhead schematic view in FIG. 7, there is one agitator 60 at each side of the separation vessel 52 for introducing vibration to the separation vessel 52. In other examples, other inputs may be utilized to induce mechanical separation within the separation vessel 52, such as gyration in a circular motion in some examples. As shown schematically, feedstock may be input to the separation vessel 52 through an inlet 53 at the top of the separation vessel 52.

Figure 8:
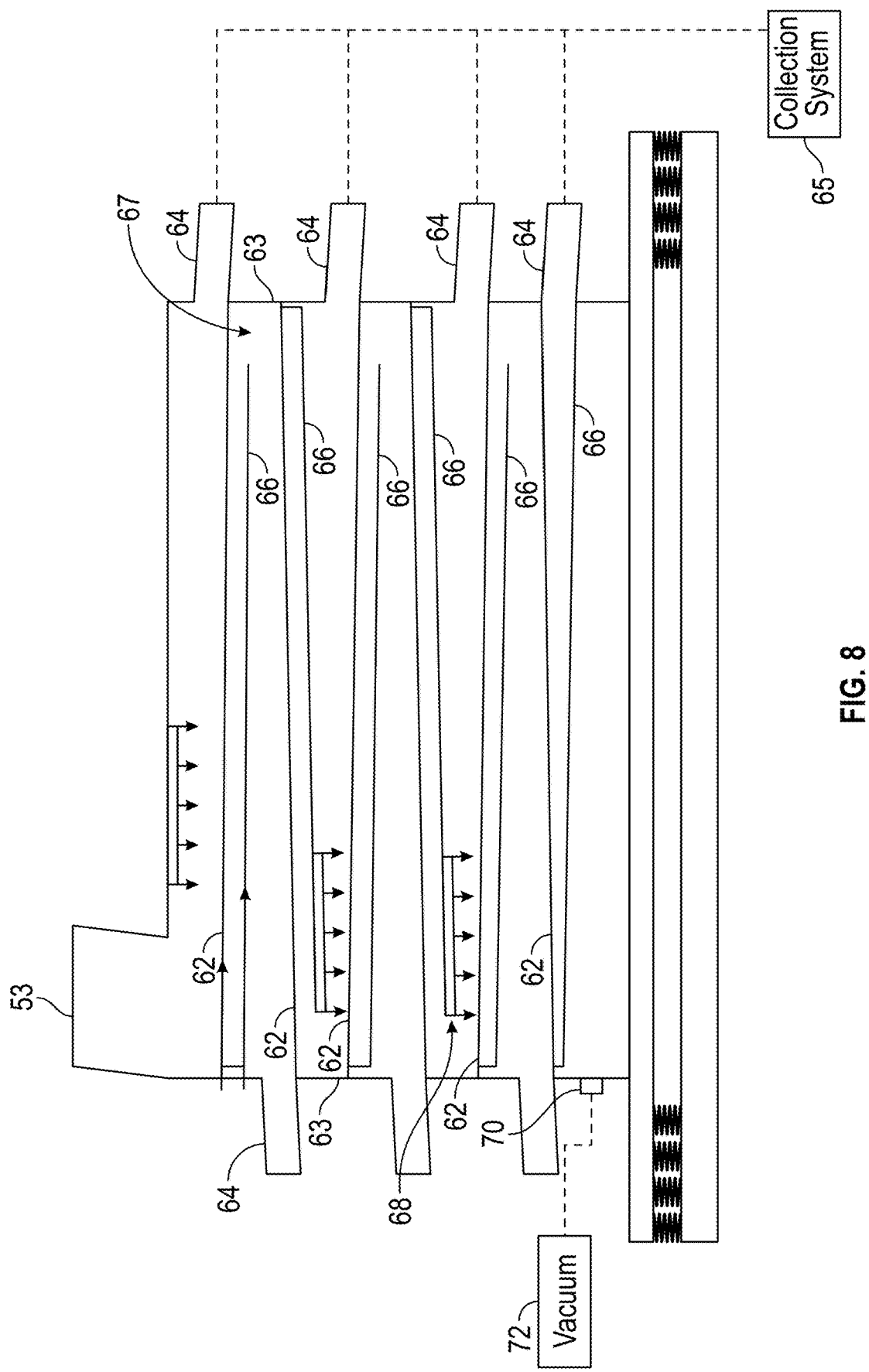
FIG. 8 schematically illustrates the example cryogenic separation system of FIGS. 6 and 7.

As illustrated in FIG. 8, within the separation vessel 52 may be a one or more mesh screen decks 62 oriented in a counterflow design as shown. In some examples, as shown, multiple screen decks 62 are utilized, and a subsequent screen deck 62 slopes toward an opposite lateral wall 63 of the separation vessel 52 relative to its above screen deck 62, similar to a stairwell in an apartment building in some examples. For example, a first screen deck 62 slopes downward as it extends in a first lateral direction, the next adjacent screen deck 62 below the first screen deck slopes downward as it extends in a second lateral direction opposite the first lateral direction, the next adjacent screen deck 62 below the second screen deck 62 slopes downward as it extends in the first lateral direction, and so on. Other screen deck configurations are contemplated.

As shown, each example screen deck 62 slopes downward toward an associated discharge port 64. As discussed further below, as the feedstock input into the separation system 28 shakes down a screen deck 62, particles of the feedstock that are too large to fit through apertures of the screen deck 62 travel on top of the screen toward the discharge port 64 associated with that screen deck 62 via agitation and gravity. The particles will eventually exit the discharge port 64, which may feed into a collection vessel, conveyer, or other collection system 65, as shown schematically. In some examples, the particles from the collection system 65 may be re-introduced into the cryogenic separation system for further refinement. Each screen deck 62 extends from a lateral wall 63 to an opposite lateral wall 63 at its associated discharge port 64 such that feedstock particles must either fall through the apertures in the screen deck 62 (into the associated catch tray or next screen deck) or collect in the discharge port 64.

Attached below the screen deck 62 is an associated catch tray 66. Particles of the material that are smaller than the screen deck 62 apertures will fall through the screen deck 62 and onto the corresponding catch tray 66. There may be one or more openings 67 at the bottom down-slope end of the catch tray 66 where the particles from the catch tray 66 will fall onto the next screen deck 62. In some examples, as shown, the associated catch tray 66 runs parallel to its associated screen deck 62. In some examples, one or more of the catch trays 66 may have one or more openings 67 near the lowest portion of the catch tray 66, to allow material to fall to the next screen. In some examples, the opening 67 is rectangular and extends most or all of the width of the tray. In other examples, multiple separate openings 67 are provided per catch tray 66. The openings 67 may be provided near an end of the catch tray 66 to direct feedstock to the top of the next screen tray 62 in some examples.

Cryogenic fluid may be injected at various locations within the separation vessel 52, such as with one or more cryogenic liquid spray manifolds 68 positioned above or below one or more of the screen decks 62 in some examples, as shown. In some examples, as shown, a cryogenic liquid spray manifold 68, which may be a tube with one or more nozzles in some examples, is positioned above every other screen deck 62. The system 28 may include one or more vacuum ports 70 for connecting a vacuum system 72 for removal of cryogenic fluid, as shown schematically and discussed further below.

Figure 9:
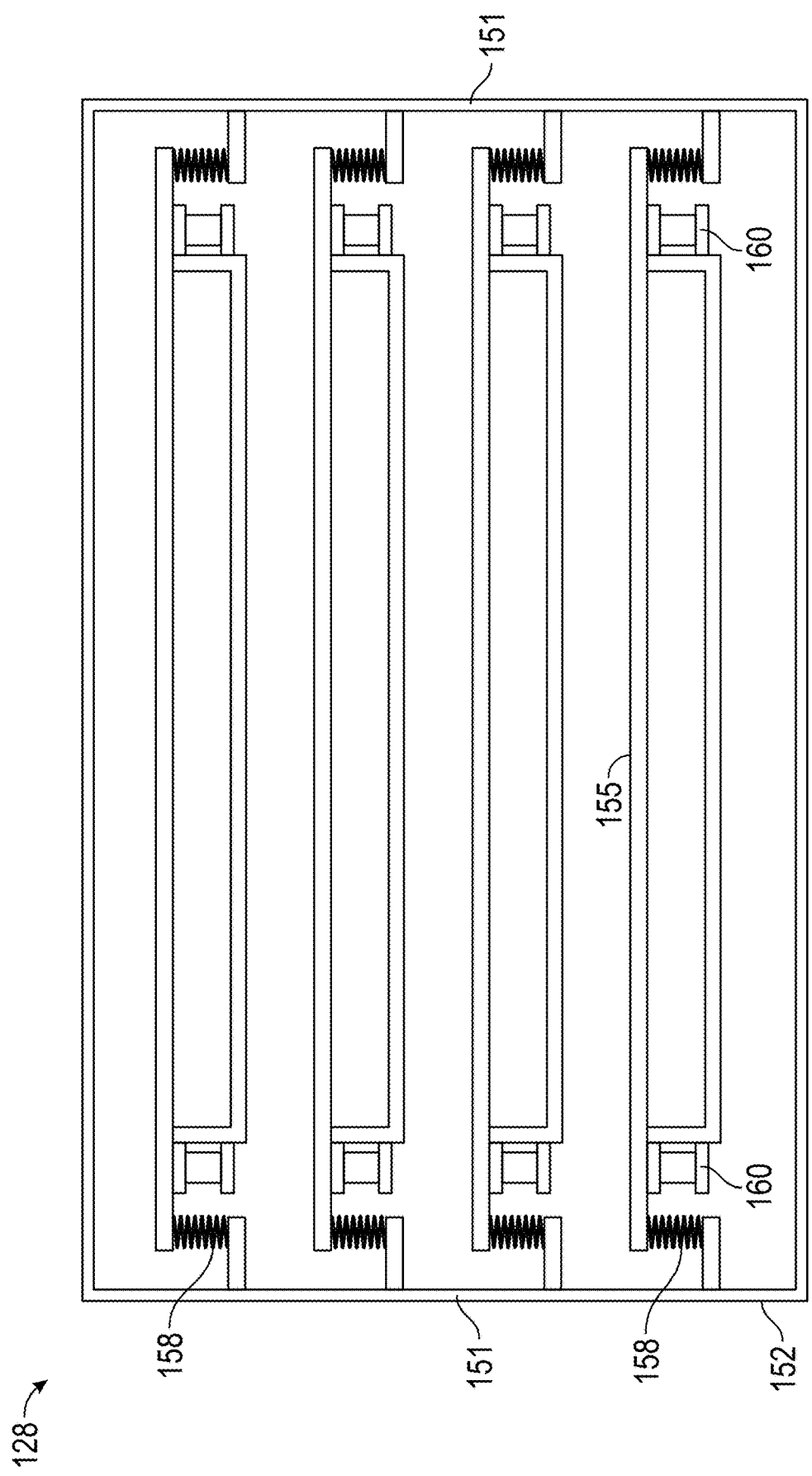
FIG. 9 schematically illustrates another example cryogenic separation system.
Figure 10:
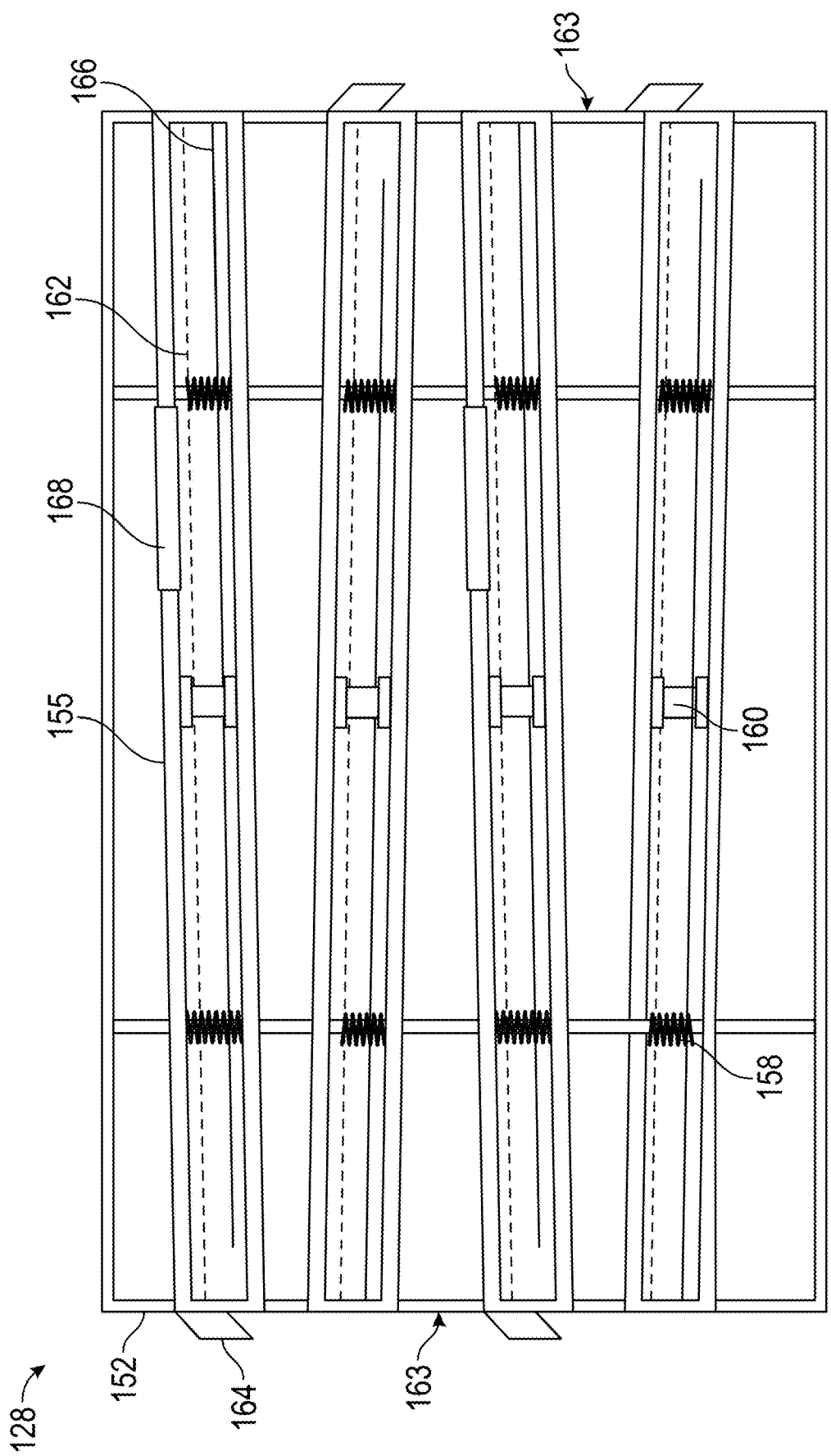
FIG. 10 schematically illustrates the example cryogenic separation system of FIG. 10.
Figure 11A:
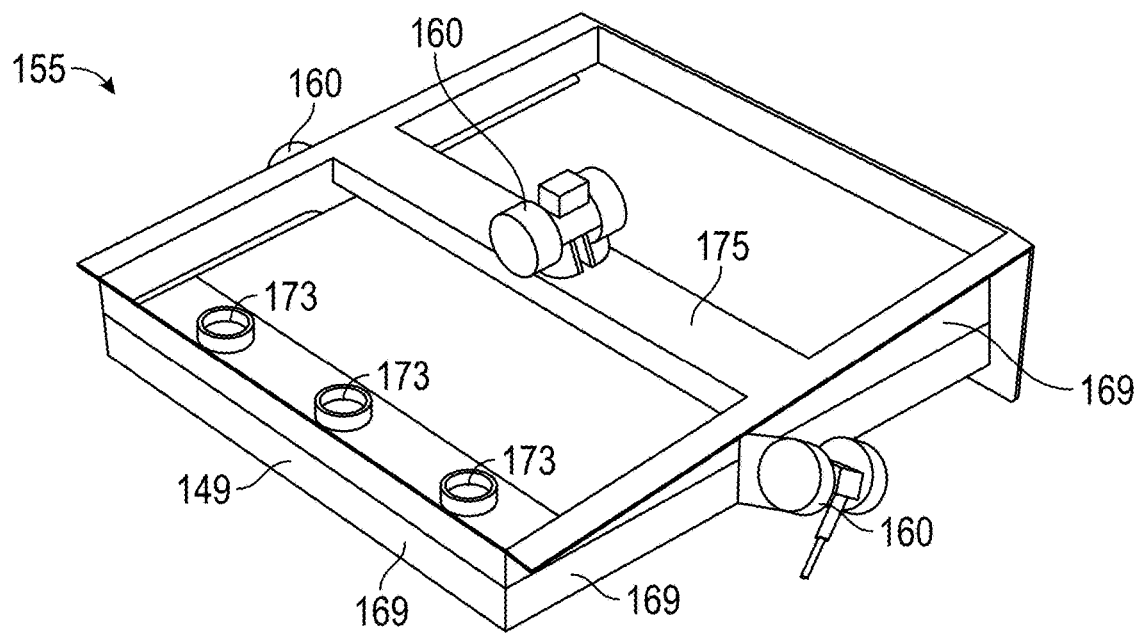
FIG. 11A illustrates a top isometric view of an example sub-frame.
Figure 11B:
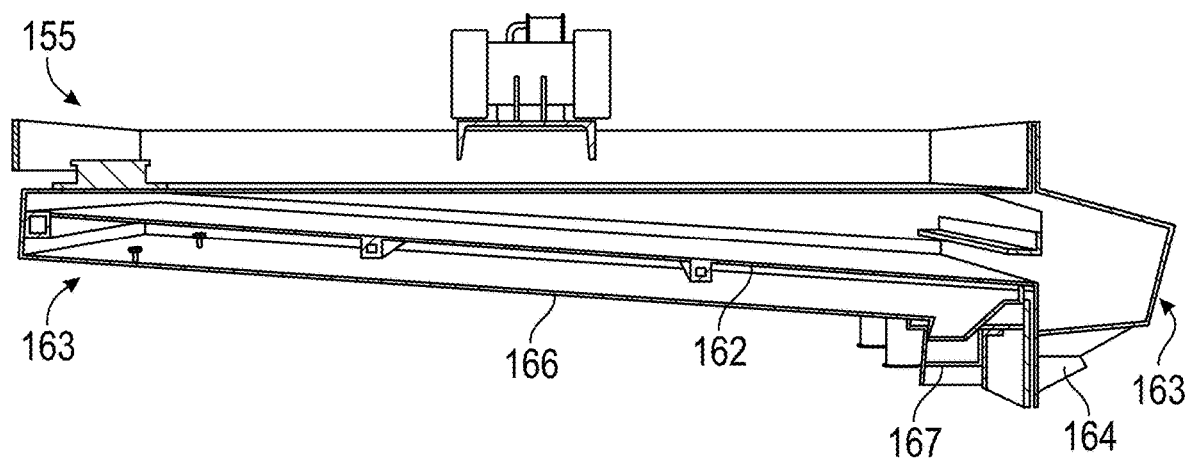
FIG. 11B illustrates a cross sectional view of the example sub-frame of FIG. 11A.
Figure 11C:
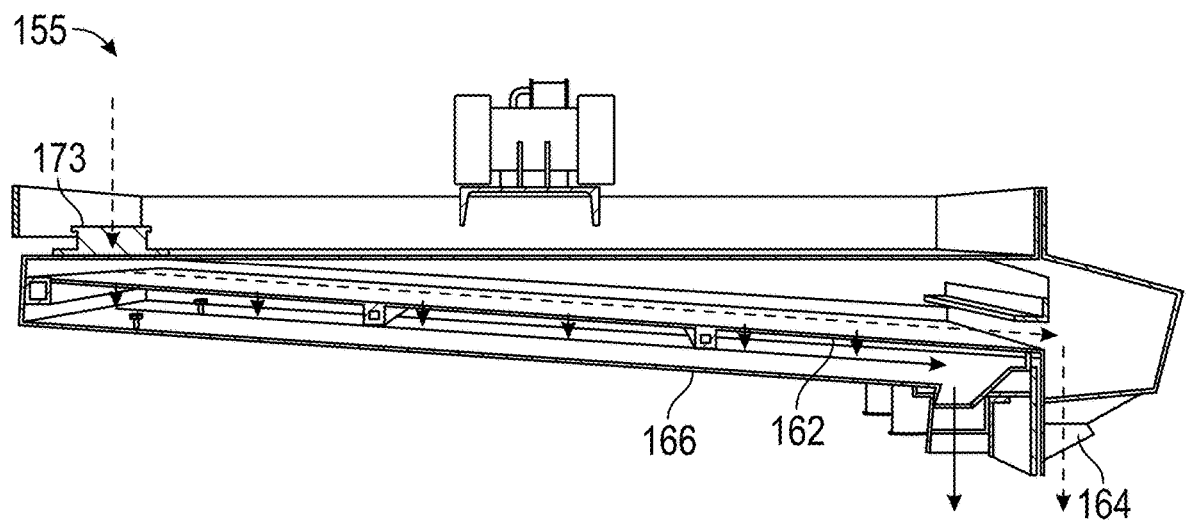
FIG. 11C schematically illustrates an example flow path through the cross section of FIG. 11B.
Figure 11D:
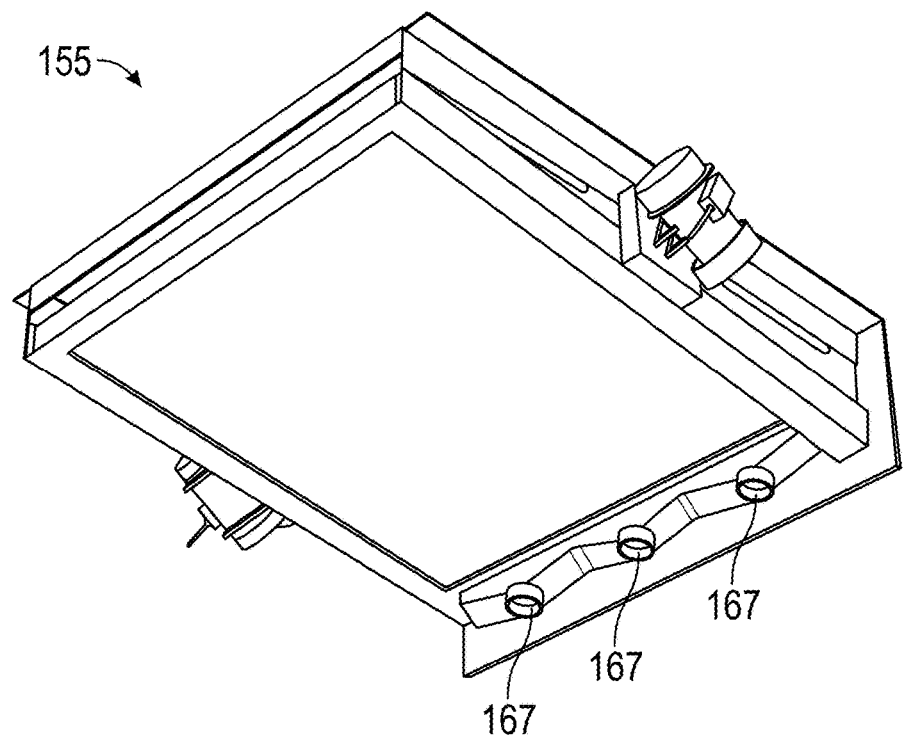
FIG. 11D illustrates a bottom isometric view of the example sub-frame of FIGS. 11A-11C.

FIGS. 9 and 10 schematically illustrate another example cryogenic separation system 128 similar to the system 28. It should be understood that like reference numerals identify corresponding or similar elements throughout the several drawings. The example system 128 includes one or more sub-frame assemblies 155 mounted to a primary frame 152, such as through vibratory springs 158 mounted to vertical posts 151 of the primary frame 152 (see FIG. 12) in some examples, as shown. There may be intermediary brackets between the sub-frames 155, springs 158, and the posts 151. In other examples, other devices such as air bags or hanger/u-joint assemblies may be utilized to reduce energy transfer from a sub frame to the primary frame 152. As shown, the sub-frame assembly 155 may contain its own agitator 160, which may be the same as the agitator 60, an example being a vibratory motor. Other example agitators 160 may include devices that induce gyration in a circular motion, shaking in the horizontal plane, or ultrasonic agitation in some examples, such as force exciters, imbalanced rotating masses, pneumatic agitators, or ultrasonic transducers. The type, number, location, orientation, and parameters of the one or more agitators 160 on each sub-frame assembly 155 may be independently adjusted according to the user requirements. In some examples, as shown in the front schematic view in FIG. 9, there is one agitator 160 on each side of the sub-frame assembly 155 for introducing vibration to that sub-frame assembly 155.

As shown in the internal side view of FIG. 10, the system 128 includes screen decks 162 and catch trays 166 configured similarly to those in the system 28. In some examples, as shown, within each sub-frame assembly 155, is a screen deck 162 that slopes downward toward an associated discharge port 164. As discussed, as feedstock input into the separation system 128 moves down the screen deck 162, particles of the feedstock that are too large to fit through apertures of the screen deck 162 travel on-top of the screen deck toward the discharge port 164 associated with that screen deck 162 via agitation and gravity.

Figure 13:
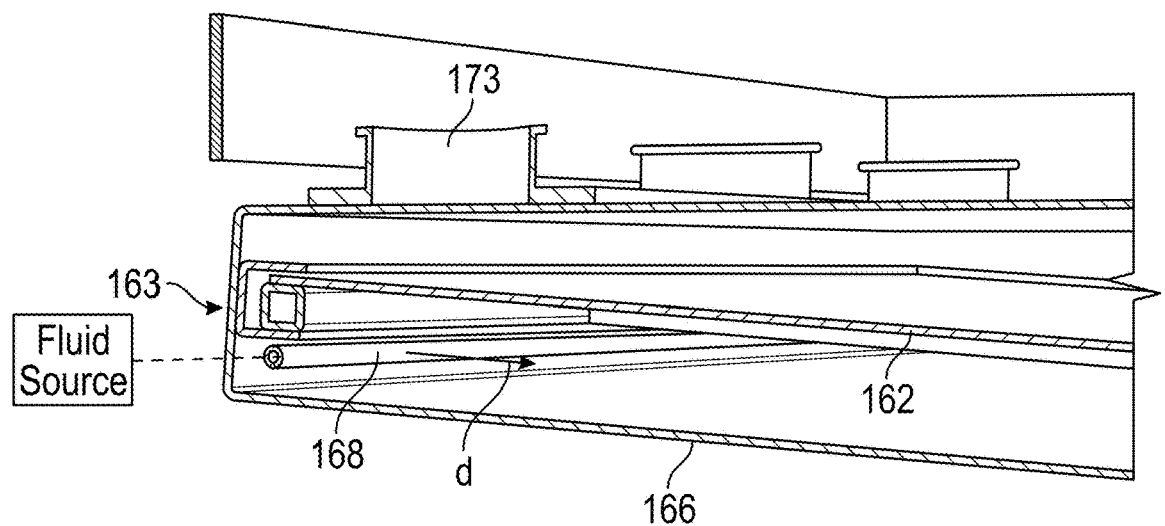
FIG. 13 schematically illustrates an example manifold configuration.

For one or more of the sub-frame assemblies 155, below the screen deck 162 is an associated catch tray 166. As discussed, particles of the material that are smaller than the screen apertures will fall through the screen deck 162 and onto the corresponding catch tray 166. There may be one or more openings 167 at the bottom down-slope end of the catch tray 166 where the particles fall onto the next screen deck 162. In some examples, as shown, the associated catch tray 166 runs parallel to its associated screen deck 162. In some examples, one or more catch trays 166 may have one or more openings 167 near the lowest portion of the catch tray 166, to allow material to fall to the next screen deck 162. Cryogenic fluid may be injected at various locations within the system 128, such as with one or more cryogenic liquid spray manifolds 168 positioned above one or more of the screen decks 162 in some examples, as shown. In some examples, as shown, a cryogenic liquid spray manifold 168 is positioned above every other screen deck 162. In some examples, as shown in FIG. 13, a cryogenic liquid spray manifold 168 is positioned between a screen deck 162 and its associated catch tray 166. In some examples still (FIG. 13), a cryogenic spray manifold 168 is positioned below the screen deck 162, toward the top end of the catch tray 166, spraying down toward the catch tray 166. In some examples, the manifold is positioned to spray 45 degrees down from a reference plane through the manifold parallel with the screen deck 162. Other cryogenic fluid injection configurations are contemplated.

There may be any number of screen decks 162 and catch trays 166 within a sub-frame assembly 155, and there may be any number of sub-frames 155 coupled to the primary frame 152. Screen decks 162 and catch trays 166 both within and between sub-frames 155 may slope in different directions towards different discharge ports 164 in some examples, depending on the application. Further, there may be any number of cryogenic separation systems connected, where inputted material may leave a discharge port 164 from one cryogenic separation system and enter the inlet of another cryogenic separation system.

In some examples, as shown, multiple screen decks 162 are utilized, and the subsequent screen deck 162 slopes toward an opposite lateral side 163 of the frame 152 relative to its above screen deck 162, similar to a stairwell in an apartment building in some examples. For example, a first screen deck 162 slopes downward as it extends in a first lateral direction, the next adjacent screen deck 162 below the first screen deck slopes downward as it extends in a second lateral direction opposite the first lateral direction, the next adjacent screen deck 162 below the second screen deck 162 slopes downward as it extends in the first lateral direction, and so on. In some examples, unlike in the system 28, containment walls may not be provided at the lateral sides 163.

FIGS. 11A-11D show various views of an example sub-frame assembly 155. The examples sub-frame assembly includes an outer frame portion 149 and may include one or both of a screen deck 162 and catch tray 166 within, and mounted to, the outer frame portion 149. The example outer frame portion 149 forms a rectangular outer frame of supports, but other shapes are contemplated. The sub-frame assembly 155 may have one or more vertical walls 169 around the perimeter of the screen deck 162 and the catch tray 166 for containment of cryogenic fluid and feedstock. The walls 169 may be provided by one or both of the frame portion 149 and the catch tray 166 in some examples. In some examples, the walls 169 may adjoin one or both of the screen deck 162 and catch tray 166.

A sub-frame inlet 173 is provided at a top end of the sub-frame assembly 155 near a first lateral side 163, such as to received feedstock onto the catch tray 162, and the one or more openings 167 are provided at a bottom end of the sub-frame assembly 155 near a second lateral side 163 opposite the first lateral side. The screen deck 162 and catch tray 166 slope downward as they extend from the first lateral side 163 to the opposite second lateral side 163. A skilled person would realize that catch trays may not be used in some examples. A discharge port 164 is provided at second lateral side 163. An agitator 160 may be mounted to a beam 175 extending across the top of the sub-frame assembly 155.

Additionally or alternatively, one or more agitators 160 may be mounted to the frame portion 149.

Figure 12:
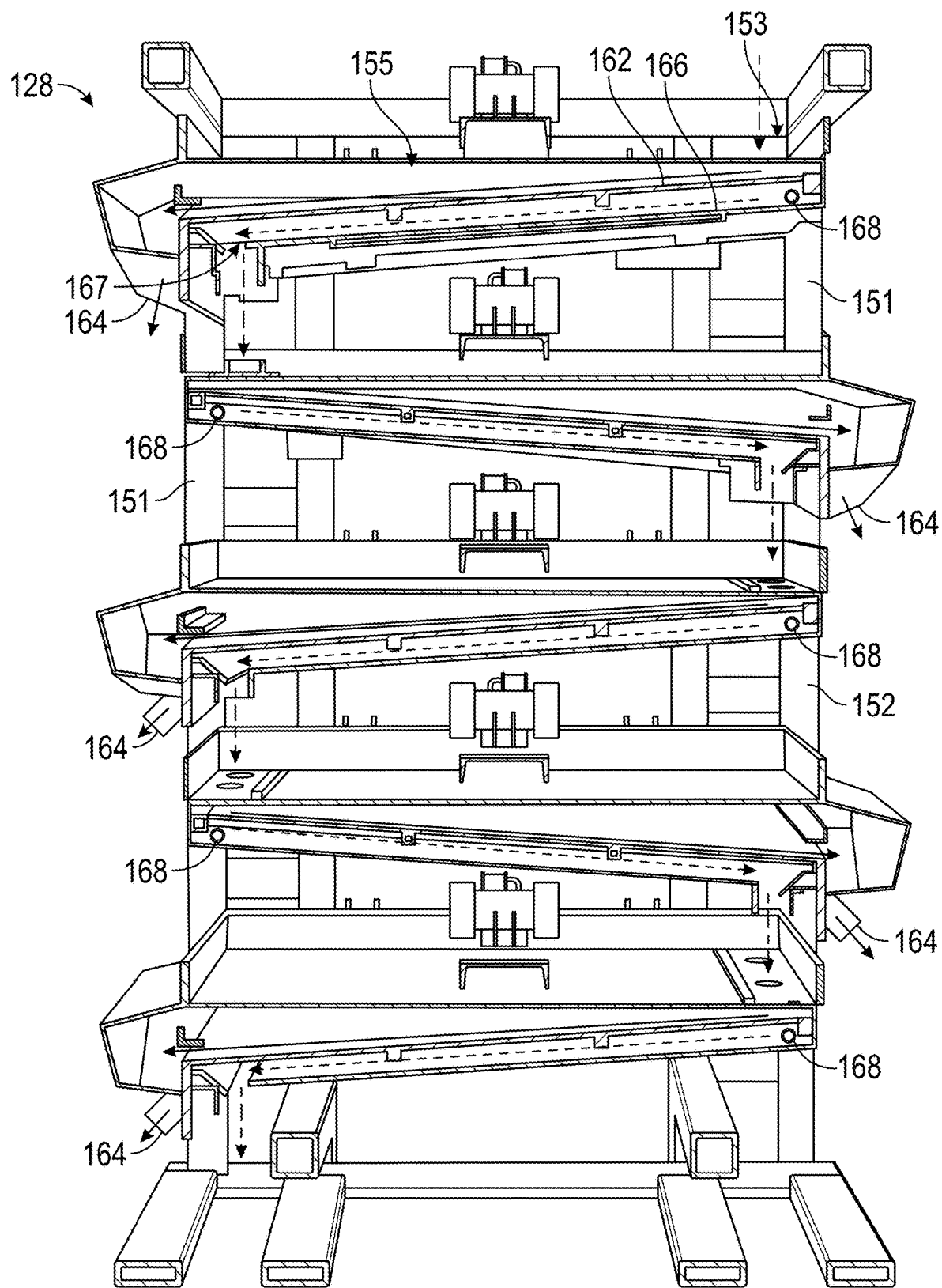
FIG. 12 schematically illustrates a flow path through the example cryogenic separation systems.

FIG. 12 schematically illustrates a flow path through the example separation system 128. For ease of viewing and explanation, the flow path is described as it pertains to the system 128, but a skilled person having the benefit of this disclosure would understand that the example system 28 may have a similar flow path. Feedstock of material to be separated, which may be immersed in cryogenic fluid in some examples, is fed into to the inlet 153 of the separation system 128. In some examples, as previously explained, the feedstock may be saturated with cryogenic fluid in a cryogenic auger, and then fed through a cryogenic roller-mill before dropping into inlet 153 of the separation system 128 via gravity.

Once inside the separation system 128, vibration and gravity cause the feedstock particles to shake toward the first discharge port 164. Particles that are larger than the openings of the screen deck 162 will shake down the first screen deck 162 and out the first discharge port 164, and particles smaller than the screen apertures will pass through the screen deck 162 onto the catch tray 166 below. Cryogenic fluid, injected at one or more locations within the separation system 128, reduces binding both between particles and between particles and the screen decks 162, increasing the efficiency at which particles pass through the screen decks 162.

Vibration, gravity, and cryogenic fluid will cause the particles on the catch tray 166 to shake down the slope through the one or more openings 167, and onto the upper portion of the next lower screen deck 162, sloped in an opposite lateral direction from the above adjacent screen deck 162 and catch tray 166. In some examples, lower screen decks 162 may be of the same micron size or smaller size than the previous screen deck 162 above.

These steps are repeated for subsequent screen decks 162 and catch trays 166 if multiple screen decks 162 and catch trays 166 are included. In this version, the example system has five screen decks 162, five catch trays 166, and six discharge ports 164. Of course, more or fewer screen decks, catch trays, and discharge ports may be utilized in some examples. In some examples, the particulates that are dispensed through the bottom-most discharge port are at a desirable size. In some examples, feedstock dispensed through other discharge ports are recirculated back through the separation system for further processing.

FIG. 13 schematically illustrates an example configuration of the manifold 168 (see also FIG. 12), which is positioned between the screen deck 162 and the catch tray 166, near the same lateral side 163 that the inlet 173 is provided, below the inlet 173, and positioned to spray cryogenic fluid in the direction d toward the catch tray 166, as is shown schematically. The manifold 168 is in fluid communication with a cryogenic fluid source as shown schematically. In some examples, the manifold 168 extends in a direction substantially parallel (+10 degrees) to the lateral side 163. The manifold 168 keeps feedstock applied with cryogenic fluid is at passes from on catch tray 166 to the next screen 162 in some examples.

Figure 14:
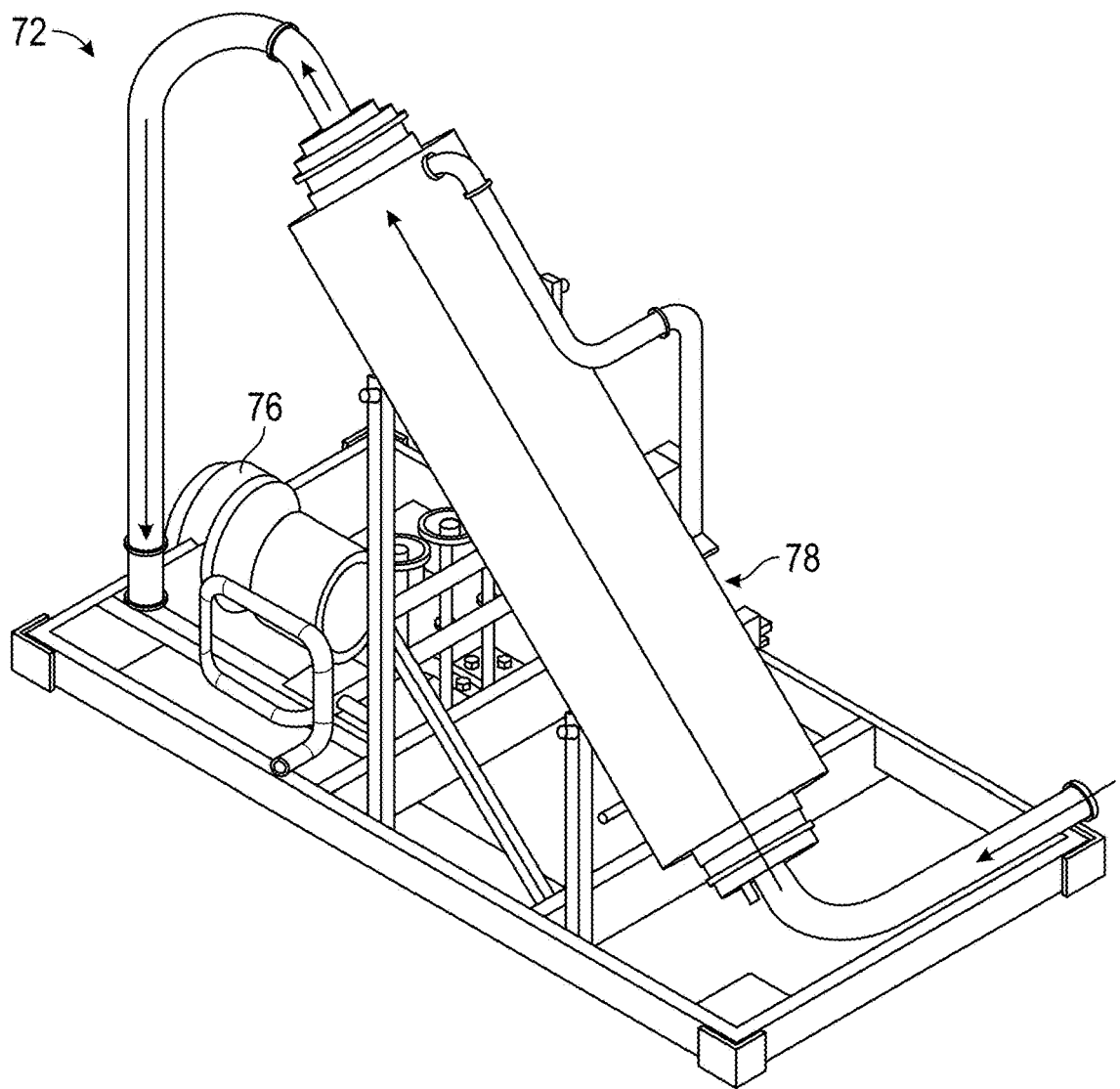
FIG. 14 illustrates an example vacuum system.
Figure 15:
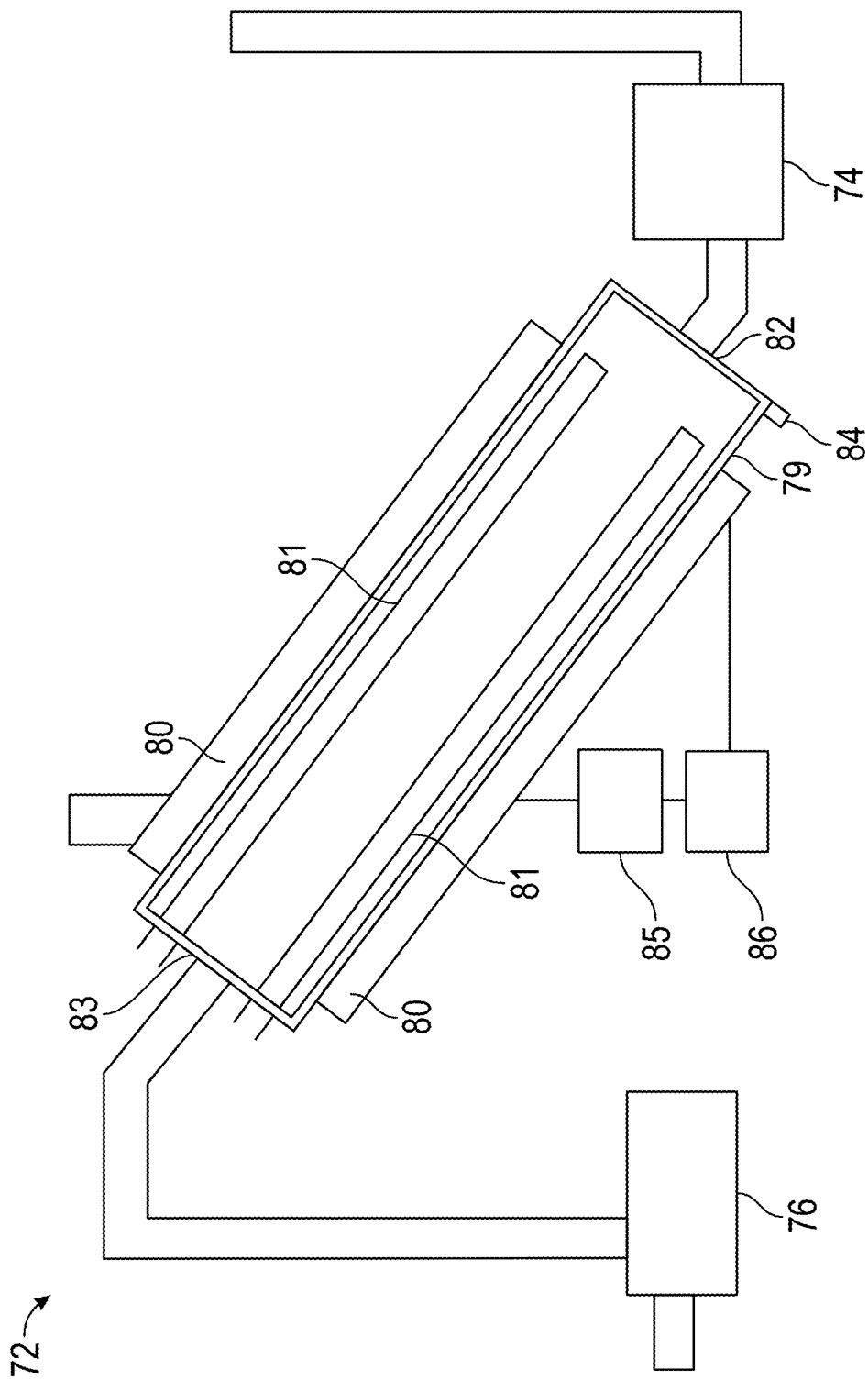
FIG. 15 schematically illustrates the example vacuum system of FIG. 14.

An example vacuum system 72 is shown at FIGS. 14 and 15. The vacuum system 72 may be utilized to remove cryogenic fluid from the system 28/128, which may otherwise displace oxygen creating a hazard for operators in some examples. A filter 74 may exist in-line between a suction port on the vacuum and one or more vacuum intake port 70 (see FIG. 8) on the cryogenic separation system 28/128 to remove fine particles before they can enter the vacuum 76. In some examples, the filter 74 is a 5-µm basket particle filter to trap particles greater than 5-µm and prevent them from traveling downstream towards the vacuum 76. Further, in some examples, a cold trap 78 may be provided between the particle filter 74 and the vacuum 76 to condense water and volatile compounds sublimated from the filtrate and prevent them from entering and damaging the vacuum 76. Further, valuable volatile compounds from the filtrate can be collected in liquid form. The cold trap 78 may include a cold trap vessel 79 heated with a heating jacket 80, where warm fluid is circulated throughout the jacket 80, such as with a heater 85 and a circulation pump 86 as shown. Inside the vessel is one or more chilled tubes or coils 81. Vapor from the cryogenic separation system 28/128, containing water and volatile compounds, is pulled through an inlet port 82 near the bottom of the vessel 79 and travels towards a vacuum suction port 83 on the top of the cold trap vessel 79. As vapor travels towards the vacuum suction port 83 within the cold trap vessel 79, it is intercepted by the chilled tube or coil 81, and the volatile compounds and water within the vapor condense into liquid and fall to the bottom of the cold trap vessel 79. A drain valve 84 may be provided at the bottom of the cold trap vessel 79 to collect the condensate. Although an example vacuum system is disclosed, a skilled person having the benefit of this disclosure would recognize that other configurations may be utilized.

Figure 16:
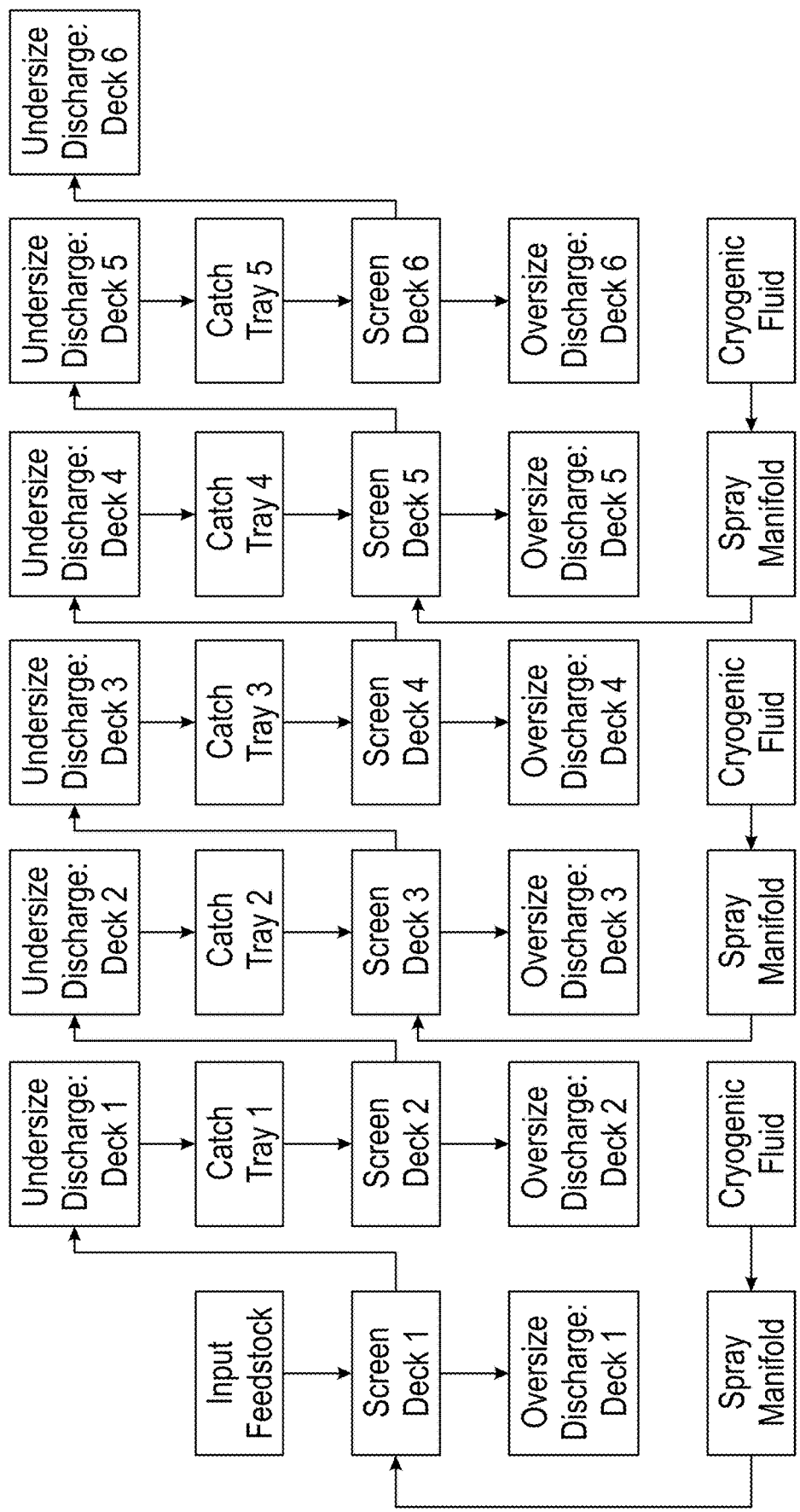
FIG. 16 illustrates a flow chart of an example separation process.

FIG. 16 illustrates a flow chart of an example process that may be used with the examples disclosed herein. Feedstock is input into the system and accumulates on a first screen deck. The feedstock is then split into oversized discharge, which may be discharged through the system such as through the example discharge ports 64, and undersized discharge, which falls into the subsequent collection tray and then the subsequent screen deck, where the process is repeated. The undersized discharge is able to fall through the apertures in the screen deck, while the oversized discharge is not. In some examples, as shown, the feedstock in the screen decks is sprayed with cryogenic fluid, such as in every other screen deck as shown. However, any manifold configuration may be utilized.

Figure 17:
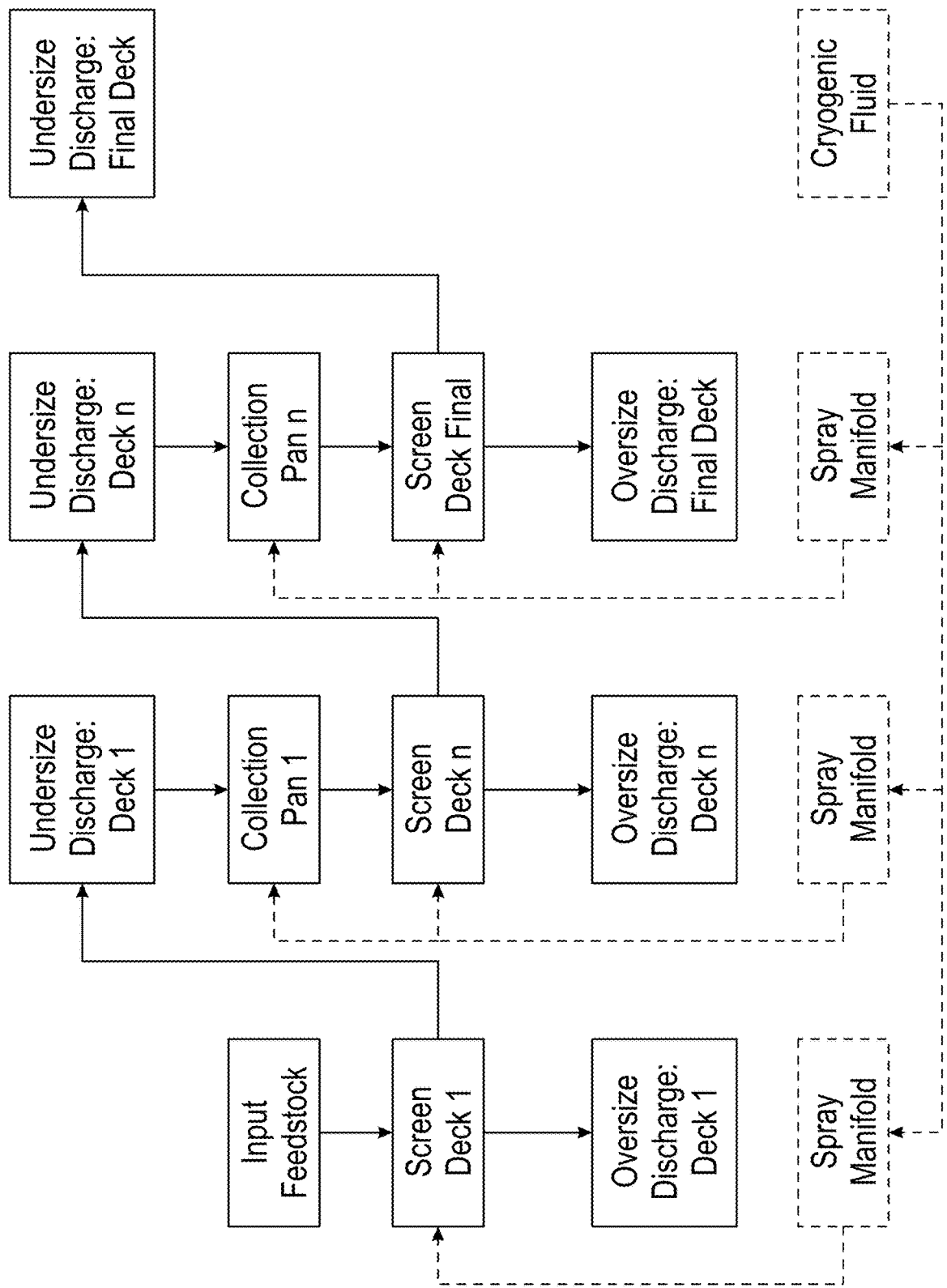
FIG. 17 illustrates a flow chart of another example separation process.

FIG. 17 illustrates a similar process and demonstrates that any number of screen decks, catch trays, and spray manifolds may be utilized.

Figure 18:
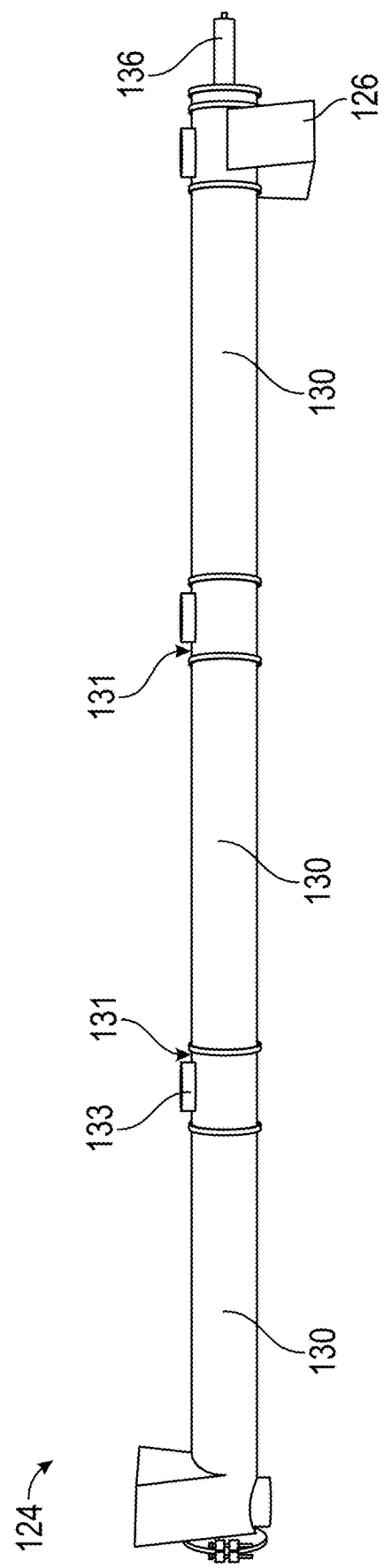
FIG. 18 illustrates another example auger.

FIG. 18 illustrates an example auger 124 substantially similar to the auger 24 shown in FIGS. 2-4. The auger 124 includes one or more auger vessels 130 connected to one another by linkage vessels 131 having one or more access ports 133. The example linkage vessels 131 and auger vessels 130 have the same diameter. The example linkage vessels 131 are separate components clamped to the auger vessels 130 via sanitary clamp fittings or similar fitting such that the connection between auger vessels 130 is sealed and material inside the auger 124, including cryogenic fluid, gas, or feedstock, does not leak. The example auger 124 can be easily disassembled, reassembled, extended, and shortened. The interior of the example auger 124 can be easily accessed via the access ports 133.

Figure 19:
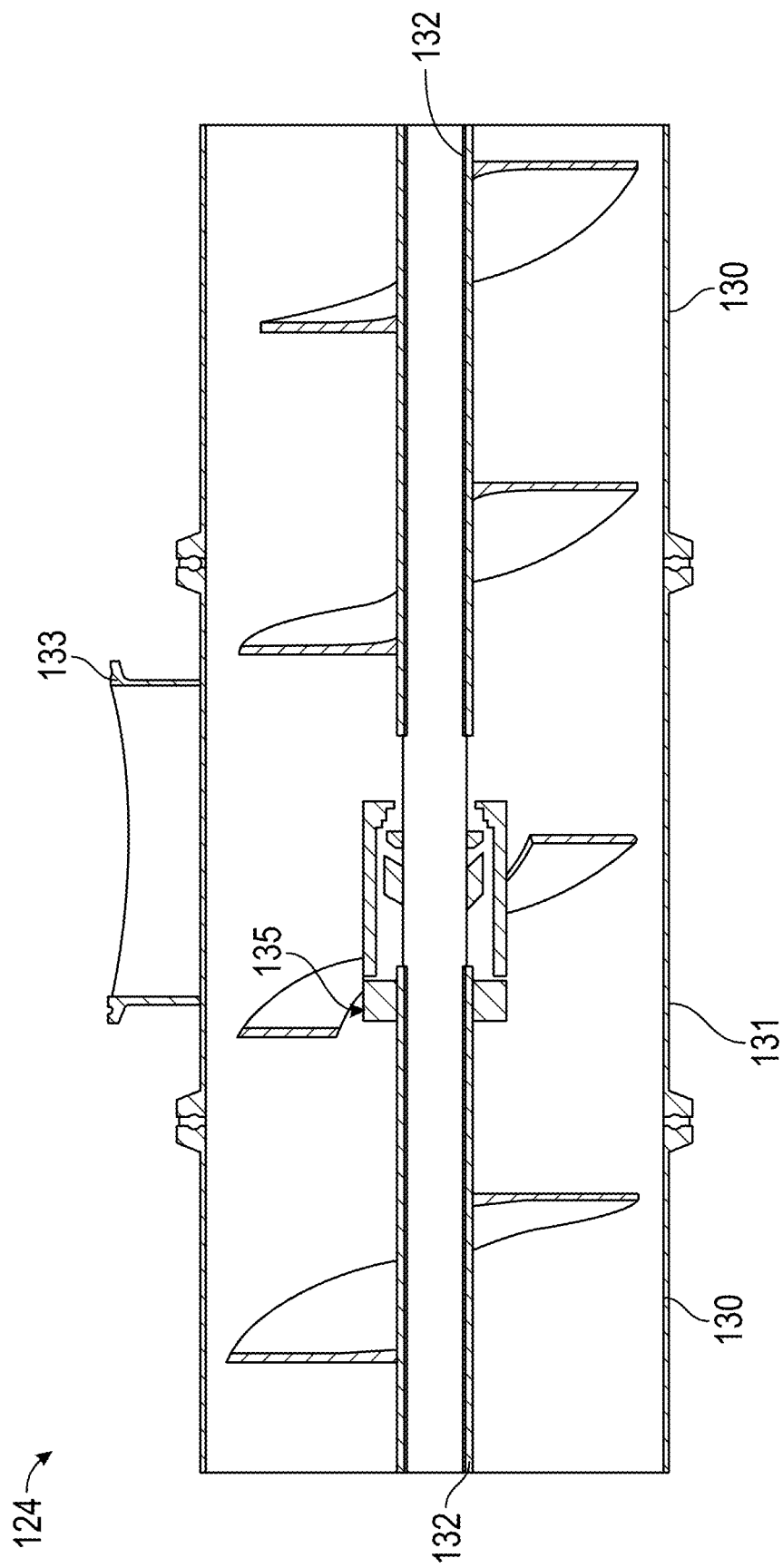
FIG. 19 illustrates an interior view of the example auger of FIG. 18.

FIG. 19 illustrates an interior view of the example auger 124. Adjacent shafts 132 within the adjacent auger vessels 130 may be connected to one another at a cryogenic adapter connection 135 that fluidly seals the adjacent shafts 132. The connection 135 may be any sealed fitting for connecting two shafts. The connection 135 may be axially aligned with the access port 133 as shown for ease of assembly and disassembly. The connection 135 provides sealing and allows fluid, such as cryogenic liquid or gas, to travel within adjacent shafts 132 without leakage. The access port 133 may be sealed with a cap when the system is in use.

Figure 20:
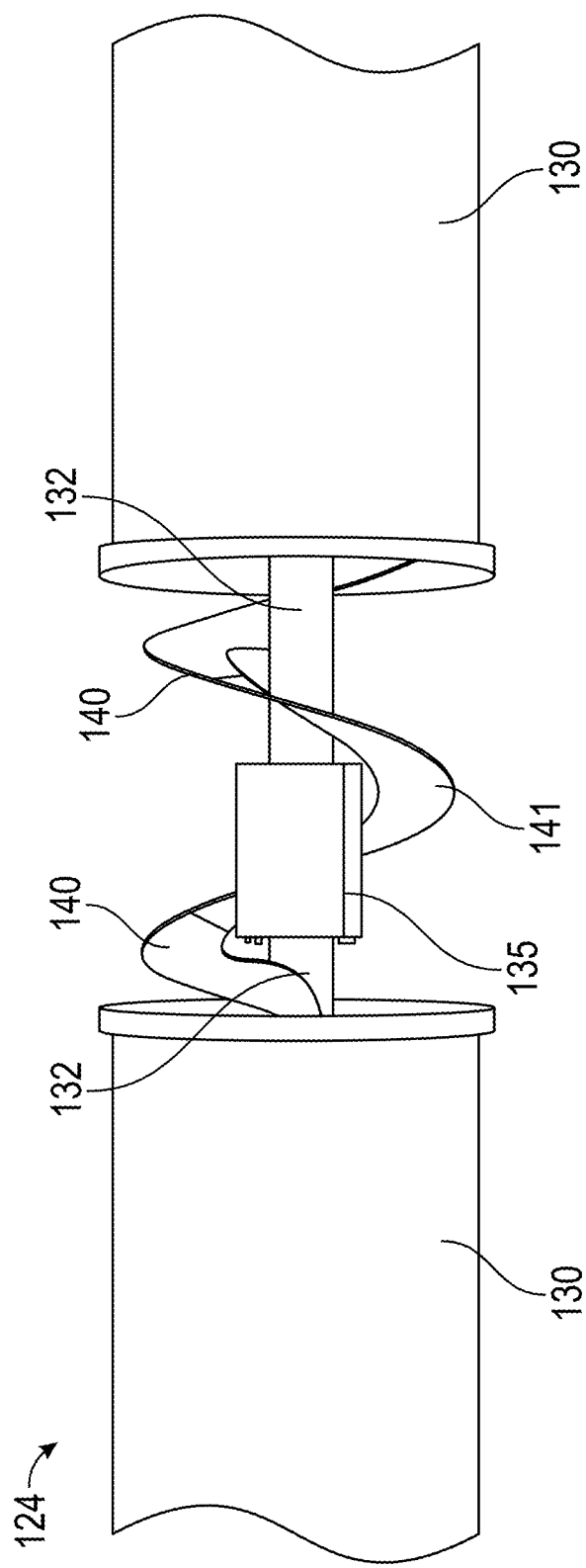
FIG. 20 illustrates another view of the example auger of FIGS. 18 and 19.

FIG. 20 illustrates another view of the example auger 124, with the linkage vessel 131 removed. As shown, the connection 135 may have an outer diameter that is less than an inner diameter of the flighting 140. Adjacent flightings 140 associated with adjacent shafts 132 may be connected to one another, such as near the connection 135, so that the adjacent flightings 140 can rotate with one another. In some examples, adjacent flightings 140 associated with adjacent shafts 132 are connected via a helical linkage flighting 141, which spans the gap between adjacent flightings 140 to create one continuous helix.

The example systems and methods disclosed herein allow for continuous separation and classification of materials based on particle size using mechanical agitation with the assistance of cryogenic fluid. The ultra-low temperature of cryogenic fluid preserves the integrity of delicate components and compounds therein during mechanical agitation, including plant trichomes. Further, cryogenic fluid improves the flow of particles through screen apertures. The cryogenic fluid prevents screen blockage by eliminating binding between particles as well as binding between particles and screen apertures. A mechanical screener using cryogenic fluid can therefore process a broad variety of feedstocks including dry, wet, or sticky resinous components (some of which may cause difficulties with traditional mechanical screeners) efficiently and without degradation. Further, this feature significantly increases the efficiency of fine particle filtration (<500 µm). Still further, unlike other liquid filtration aids such as water, cryogenic fluids—such as liquid argon or nitrogen—do not act as a solvent and will not extract desirable compounds during filtration. Liquid nitrogen, having a viscosity nearly five times less than liquid water, moves through screens much easier and with less resistance than traditional filtration aids.

Most prior art indumentum-separation technologies are batch-style. The systems and methods disclosed herein allow for continuous feed in cryogenic fluid and continuous discharge of output product. Thus, when compared to prior art systems, the disclosed systems and methods can process orders of magnitude more feedstock in less time. The volume and mass of output product is significantly reduced relative to the input feedstock, while most of the value components are retained.

A cryogenic processing system may be said to include a cryogenic fluid source, and an auger including an auger vessel containing at least one screw assembly. The screw assembly may include a flighting, and a hollow shaft radially inward of the flighting, the shaft in fluid communication with the cryogenic fluid source and including one or more nozzles for dispensing cryogenic fluid from the cryogenic fluid source within the auger vessel.

A method of processing feedstock may be said to include moving the feedstock through an auger, and spraying the feedstock within the auger with cryogenic fluid through one or more nozzles disposed on a shaft of a screw assembly of the auger.

A cryogenic processing system may be said to include a cryogenic fluid source, and a separation system. The separation system may include a first screen deck, a second screen deck below the first screen deck, at least one agitator for introducing agitation to the first screen deck, and at least one cryogenic spray manifold positioned to spray cryogenic fluid from the cryogenic fluid source onto feedstock flowing through the separation system.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A cryogenic processing system, comprising:
   a cryogenic liquid or gas source; and
   an auger including a vessel containing at least one screw assembly comprising:
   a hollow shaft in fluid communication with the cryogenic liquid or gas source and including one or more nozzles for dispensing cryogenic liquid or gas from the cryogenic liquid or gas source within the vessel; and
   a flighting arranged around the shaft.

2. The system of claim 1, wherein the auger vessel is cylindrical and includes a central axis, and the shaft has a shaft central axis aligned with the auger vessel central axis.

3. The system of claim 1, wherein the vessel includes an inlet and an outlet, the system comprising:
   a separation system downstream of the outlet, the separation system comprising:
   a primary frame; and
   a sub-frame assembly coupled to the primary frame and including a screen deck and a catch tray below the screen deck.

4. The system of claim 3, the separation system comprising:
   an agitator for introducing agitation to the sub-frame assembly.

5. The system of claim 4, the separation system comprising:
   a cryogenic spray manifold positioned to spray cryogenic liquid or gas from the cryogenic liquid or gas source onto feedstock flowing through the separation system.

6. The system of claim 3, comprising, a comminutor between the vessel outlet and the separation system.

7. The system of claim 6, wherein the comminutor comprises a mill.

8. The system of claim 1, wherein the vessel includes an inlet and an outlet, the system comprising:
   a separation system downstream of the outlet, the separation system comprising:
   a cryogenic spray manifold positioned to spray cryogenic liquid or gas from the cryogenic liquid or gas source onto feedstock flowing through the separation system.

9. The system of claim 1, wherein the auger includes an inlet and a discharge port, and the discharge port is elevated relative to the inlet.

10. A cryogenic processing system, comprising:
    a cryogenic liquid or gas source; and
    a separation system, comprising:
    a primary frame;
    a sub-frame assembly coupled to the primary frame and including a screen deck and a catch tray below the screen deck;
    an agitator for introducing agitation to the sub-frame assembly; and
    a cryogenic spray manifold positioned to spray cryogenic liquid or gas from the cryogenic liquid or gas source onto feedstock flowing through the separation system.

11. The system of claim 10, wherein the sub-frame assembly is mounted to one or more posts of the primary frame.

12. The system of claim 10, comprising:
a second sub-frame assembly coupled to the primary frame and including a second screen deck and a second catch tray below the second screen deck.

13. The system of claim 12, wherein the screen deck and the catch tray slope downward as they extend from a first lateral side to a second lateral side, and the second screen deck and the second catch tray slope downward as they extend from the second lateral side to the first lateral side.

14. The system of claim 10, wherein the screen deck and the catch tray slope downward as they extend from a first lateral side to a second lateral side.

15. The system of claim 10, wherein the catch tray includes one or more openings near a second lateral side of the sub-frame assembly, and the sub-frame assembly includes one or more inlet openings near a first lateral side of the sub-frame assembly opposite the second lateral side.

16. The system of claim 13, wherein the sub-frame assembly includes a discharge port at the second lateral side.

17. A method of processing feedstock, the method comprising:
moving the feedstock through an auger;
spraying the feedstock within the auger with cryogenic liquid or gas through one or more nozzles disposed on a shaft of a screw assembly of the auger;
moving the feedstock from the auger to a separation system; and
removing the cryogenic liquid or gas from at least one of the auger and the separation system.

18. The method of claim 17, comprising:
filtering particles from the removed cryogenic liquid or gas.

19. The method of claim 17, comprising:
collecting volatile compounds from the removed cryogenic liquid or gas.

20. The method of claim 17, the separation system including a screen deck, the method comprising:
agitating the screen deck; and
spraying the feedstock within the separation system with cryogenic liquid or gas.

* * * * *